(12) United States Patent
Moore

(10) Patent No.: US 10,532,275 B2
(45) Date of Patent: *Jan. 14, 2020

(54) LASER ACTIVATED MOVING TARGET

(71) Applicant: CRIMSON TRACE CORPORATION, Wilsonville, OR (US)

(72) Inventor: Larry E. Moore, Cottonwood, AZ (US)

(73) Assignee: CRIMSON TRACE CORPORATION, Srpingfield, MA (US)

(*) Notice: Subject to any disclaimer, the term of this patent is extended or adjusted under 35 U.S.C. 154(b) by 321 days.

This patent is subject to a terminal disclaimer.

(21) Appl. No.: 15/181,279

(22) Filed: Jun. 13, 2016

(65) Prior Publication Data
US 2016/0361626 A1 Dec. 15, 2016

Related U.S. Application Data

(63) Continuation-in-part of application No. 14/955,440, filed on Dec. 1, 2015, now Pat. No. 9,915,508, and a
(Continued)

(51) Int. Cl.
A63F 9/02 (2006.01)
A63F 13/25 (2014.01)
(Continued)

(52) U.S. Cl.
CPC .......... *A63F 9/0291* (2013.01); *A63F 13/213* (2014.09); *A63F 13/25* (2014.09);
(Continued)

(58) Field of Classification Search
CPC .................. A63F 9/0291; G07F 17/3272
(Continued)

(56) References Cited

U.S. PATENT DOCUMENTS 1,490,272 A 4/1924 Hickam
1,898,566 A 2/1933 Noel
(Continued)

FOREIGN PATENT DOCUMENTS

BE 1009564 5/1997
EP 1046877 10/2000
FR 862247 3/1941

OTHER PUBLICATIONS

UPSTO; Notice of Allowance and Fees Due dated Jul. 11, 2017 in U.S. Appl. No. 15/130,744.
(Continued)

*Primary Examiner* — Thomas J Hong
(74) *Attorney, Agent, or Firm* — Schwabe Williamson & Wyatt, P.C.

(57) ABSTRACT

A target that, depending upon a type of game for which the target is programmed, senses whether and where it has been struck by a laser light. The target face displays a game board (such as a dart board) and allows laser light to pass through. A plurality of light sensors are behind the target face. When a designated portion of the target face is struck by a laser light, a sensor records the strike. One or more of: the game to be played using the target, the number of players, starting the game, resetting the target for a new game, and changing players, is accomplished remotely by striking an area on the target with laser light.

26 Claims, 18 Drawing Sheets

Related U.S. Application Data continuation-in-part of application No. 13/353,241, filed on Jan. 18, 2012, now Pat. No. 9,429,404.

(60) Provisional application No. 62/191,240, filed on Jul. 10, 2015.

(51) Int. Cl.
   *A63F 13/213* (2014.01)
   *A63F 13/837* (2014.01)
   *F41J 5/02* (2006.01)

(52) U.S. Cl.
   CPC .............. *A63F 13/837* (2014.09); *F41J 5/02* (2013.01); *A63F 2300/8076* (2013.01)

(58) Field of Classification Search
   USPC .......................................................... 434/21
   See application file for complete search history.

(56) References Cited

U.S. PATENT DOCUMENTS

| | | |
|---|---|---|
| 2,268,056 A | 12/1941 | Nelson et al. |
| 2,308,627 A | 1/1943 | Rickenbacher |
| 2,357,951 A | 9/1944 | Hale |
| 2,430,469 A | 11/1947 | Karnes |
| 2,597,565 A | 5/1952 | Chandler et al. |
| 2,701,930 A | 2/1955 | Dolan |
| 2,773,309 A | 12/1956 | Elliot |
| 2,780,882 A | 2/1957 | Temple |
| 2,826,848 A | 3/1958 | Davies |
| 2,844,710 A | 7/1958 | Rudolf |
| 2,894,117 A | 7/1959 | Koskey |
| 2,904,888 A | 9/1959 | Niesp |
| 2,926,916 A | 3/1960 | Pearson |
| 3,104,478 A | 9/1963 | Strauss |
| 3,112,567 A | 12/1963 | Flanagan |
| 3,192,915 A | 7/1965 | Norris et al. |
| 3,284,905 A | 11/1966 | Simmons |
| 3,510,965 A | 5/1970 | Rhea |
| 3,526,972 A | 9/1970 | Sumpf |
| 3,573,868 A | 4/1971 | Giannetti |
| 3,618,673 A | 11/1971 | Gossett |
| 3,633,285 A | 1/1972 | Sensney |
| 3,641,676 A | 2/1972 | Knutsen et al. |
| 3,645,635 A | 2/1972 | Steck |
| 3,748,751 A | 7/1973 | Breglia |
| 3,801,205 A | 4/1974 | Eggenschwyler |
| 3,813,795 A | 6/1974 | Marshall |
| 3,914,873 A | 10/1975 | Elliot, Jr. et al. |
| 3,948,522 A | 4/1976 | Fixler |
| 3,992,783 A | 11/1976 | Dunlap et al. |
| 3,995,376 A | 12/1976 | Kimble et al. |
| 4,026,054 A | 5/1977 | Snyder |
| 4,048,489 A | 9/1977 | Giannetti |
| 4,063,368 A | 12/1977 | McFarland |
| 4,079,534 A | 3/1978 | Snyder |
| 4,102,059 A | 7/1978 | Kimble et al. |
| 4,144,505 A | 3/1979 | Angelbeck et al. |
| 4,146,329 A | 3/1979 | King et al. |
| 4,148,245 A | 4/1979 | Steffanus et al. |
| 4,156,981 A | 6/1979 | Lusk |
| 4,168,588 A | 9/1979 | Snyder |
| 4,220,983 A | 9/1980 | Schroeder |
| 4,222,564 A | 9/1980 | Allen |
| 4,229,103 A | 10/1980 | Hipp |
| 4,232,867 A | 11/1980 | Tate |
| 4,233,770 A | 11/1980 | de Filippis et al. |
| 4,234,911 A | 11/1980 | Faith |
| 4,295,289 A | 10/1981 | Snyder |
| 4,305,091 A | 12/1981 | Cooper |
| 4,346,530 A | 8/1982 | Stewart |
| 4,348,828 A | 9/1982 | Snyder |
| 4,352,665 A | 10/1982 | Kimble et al. |
| 4,452,458 A | 6/1984 | Timander |
| 4,481,561 A | 11/1984 | Lanning |
| 4,487,583 A | 12/1984 | Brucker |
| 4,488,369 A | 12/1984 | Van Note |
| 4,541,191 A | 9/1985 | Morris et al. |
| 4,567,810 A | 2/1986 | Preston |
| 4,662,845 A | 5/1987 | Gallaher |
| 4,713,889 A | 12/1987 | Santiago |
| 4,763,431 A | 8/1988 | Allan et al. |
| 4,825,258 A | 4/1989 | Whitson |
| 4,830,617 A | 5/1989 | Hancox et al. |
| 4,860,775 A | 8/1989 | Reeves |
| 4,876,816 A | 10/1989 | Triplett |
| 4,878,307 A | 11/1989 | Singletary |
| 4,891,476 A | 1/1990 | Nation et al. |
| 4,934,086 A | 6/1990 | Houde-Walter |
| 4,939,320 A | 7/1990 | Graulty |
| 4,939,863 A | 7/1990 | Alexander et al. |
| 4,945,667 A | 8/1990 | Rogalski et al. |
| 4,953,316 A | 9/1990 | Litton et al. |
| 4,967,642 A | 11/1990 | Mihaita |
| 5,001,836 A | 3/1991 | Cameron et al. |
| 5,004,423 A | 4/1991 | Bertrams |
| 5,033,219 A | 7/1991 | Johnson et al. |
| 5,048,211 A | 9/1991 | Hepp |
| 5,048,215 A | 9/1991 | Davis |
| 5,052,138 A | 10/1991 | Crain |
| 5,090,805 A | 2/1992 | Stawarz |
| 5,092,071 A | 3/1992 | Moore |
| 5,119,576 A | 6/1992 | Erning |
| 5,177,309 A | 1/1993 | Willoughby et al. |
| 5,178,265 A | 1/1993 | Sepke |
| 5,179,235 A | 1/1993 | Toole |
| 5,194,007 A | 3/1993 | Marshall |
| 5,197,796 A | 3/1993 | Moore |
| 5,208,826 A | 5/1993 | Kelly |
| 5,179,124 A | 6/1993 | Schoenwald et al. |
| 5,228,427 A | 7/1993 | Gardner |
| 5,237,773 A | 8/1993 | Claridge |
| 5,241,146 A | 8/1993 | Priesemuth |
| 5,272,514 A | 12/1993 | Dor |
| 5,299,375 A | 4/1994 | Thummel et al. |
| 5,343,376 A | 8/1994 | Huang |
| 5,353,208 A | 10/1994 | Moore |
| 5,355,608 A | 10/1994 | Teetzel |
| 5,355,609 A | 10/1994 | Schenke |
| 5,365,669 A | 11/1994 | Rustick et al. |
| 5,367,779 A | 11/1994 | Lee |
| 5,373,644 A | 12/1994 | De Paoli |
| 5,375,362 A | 12/1994 | McGarry et al. |
| 5,388,335 A | 2/1995 | Jung |
| 5,392,550 A | 2/1995 | Moore et al. |
| 5,400,540 A | 3/1995 | Solinsky et al. |
| 5,419,072 A | 5/1995 | Moore et al. |
| 5,432,598 A | 7/1995 | Szatkowski |
| 5,435,091 A | 7/1995 | Toole et al. |
| 5,446,535 A | 8/1995 | Williams |
| 5,448,834 A | 9/1995 | Huang |
| 5,454,168 A | 10/1995 | Langner |
| 5,455,397 A | 10/1995 | Havenhill et al. |
| 5,467,552 A | 11/1995 | Cupp et al. |
| 5,488,795 A | 2/1996 | Sweat |
| D368,121 S | 3/1996 | Lam |
| 5,509,226 A | 4/1996 | Houde-Walter |
| 5,499,455 A | 5/1996 | Palmer |
| 5,515,636 A | 5/1996 | McGarry et al. |
| 5,481,819 A | 6/1996 | Teetzel |
| 5,531,040 A | 7/1996 | Moore |
| 5,555,662 A | 9/1996 | Teetzel |
| 5,557,872 A | 9/1996 | Langner |
| 5,566,459 A | 10/1996 | Breda |
| 5,581,898 A | 12/1996 | Thummel |
| 5,584,137 A | 12/1996 | Teetzel |
| 5,590,486 A | 1/1997 | Moore |
| 5,598,958 A | 2/1997 | Ryan, III et al. |
| 5,605,461 A | 2/1997 | Seeton |
| 5,618,099 A | 4/1997 | Brubacher |
| 5,621,999 A | 4/1997 | Moore |
| 5,622,000 A | 4/1997 | Marlowe |
| 5,654,594 A | 8/1997 | Bjornsen, III |

(56) References Cited

U.S. PATENT DOCUMENTS

| | | |
|---|---|---|
| 5,669,174 A | 9/1997 | Teetzel |
| 5,671,561 A | 9/1997 | Johnson et al. |
| 5,685,106 A | 11/1997 | Shoham |
| 5,685,636 A | 11/1997 | German |
| 5,694,202 A | 12/1997 | Mladjan et al. |
| 5,694,713 A | 12/1997 | Paldino |
| 5,704,153 A | 1/1998 | Kaminski et al. |
| 5,706,600 A | 1/1998 | Toole et al. |
| 5,716,216 A | 2/1998 | O'Loughlin |
| 5,735,070 A | 4/1998 | Vasquez et al. |
| 5,787,631 A | 8/1998 | Kendall |
| 5,788,500 A | 8/1998 | Gelber |
| 5,822,905 A | 10/1998 | Teetzel |
| 5,842,300 A | 12/1998 | Cheshelski et al. |
| 5,842,942 A | 12/1998 | Doht et al. |
| 5,847,345 A | 12/1998 | Harrison |
| 5,867,930 A | 2/1999 | Kaminski et al. |
| 5,881,707 A | 3/1999 | Gardner |
| 5,892,221 A | 4/1999 | Lev |
| 5,896,691 A | 4/1999 | Kaminski et al. |
| 5,905,238 A | 5/1999 | Hung |
| 5,909,951 A | 6/1999 | Johnsen et al. |
| 5,922,030 A | 7/1999 | Shank et al. |
| 5,967,133 A | 10/1999 | Gardner |
| 5,983,774 A | 11/1999 | Mihaita |
| 6,003,504 A | 12/1999 | Rice et al. |
| 6,023,875 A | 2/2000 | Fell et al. |
| 6,035,843 A | 3/2000 | Smith et al. |
| 6,146,141 A | 11/2000 | Schumann |
| 6,151,788 A | 11/2000 | Cox et al. |
| 6,219,952 B1 | 4/2001 | Mossberg et al. |
| 6,230,431 B1 | 5/2001 | Bear |
| 6,237,271 B1 | 5/2001 | Kaminski |
| 6,282,829 B1 | 9/2001 | Mossberg et al. |
| 6,289,624 B1 | 9/2001 | Hughes et al. |
| 6,293,869 B1 | 9/2001 | Kwan |
| 6,295,753 B1 | 10/2001 | Thummel |
| 6,301,046 B1 | 10/2001 | Tai et al. |
| 6,318,228 B1 | 11/2001 | Thompson |
| 6,327,806 B1 | 12/2001 | Paige |
| 6,363,648 B1 | 4/2002 | Kranich et al. |
| 6,366,349 B1 | 4/2002 | Houde-Walter |
| 6,371,004 B1 | 4/2002 | Peterson |
| 6,378,237 B1 | 4/2002 | Matthews et al. |
| 6,385,893 B1 | 5/2002 | Cheng |
| 6,389,729 B2 | 5/2002 | Rauch et al. |
| 6,389,730 B1 | 5/2002 | Millard |
| 6,397,509 B1 | 6/2002 | Langner |
| 6,421,947 B1 | 7/2002 | Fuller |
| 6,430,861 B1 | 8/2002 | Ayers et al. |
| 6,434,874 B1 | 8/2002 | Hines |
| 6,442,880 B1 | 9/2002 | Allan |
| 6,345,464 B1 | 12/2002 | Kim et al. |
| 6,487,807 B1 | 12/2002 | Kopman et al. |
| 6,499,247 B1 | 12/2002 | Peterson |
| 6,526,688 B1 | 3/2003 | Danielson et al. |
| 6,568,118 B1 | 5/2003 | Teetzel |
| 6,571,503 B2 | 6/2003 | Thorpe |
| 6,572,375 B2 | 6/2003 | Shechter et al. |
| 6,575,753 B2 | 6/2003 | Rosa et al. |
| 6,578,311 B2 | 6/2003 | Danielson et al. |
| 6,579,098 B2 | 6/2003 | Shechter et al. |
| 6,591,536 B2 | 7/2003 | Houde-Walter et al. |
| 6,606,797 B1 | 8/2003 | Gandy |
| 6,614,510 B1 | 9/2003 | Rogers et al. |
| 6,616,452 B2 | 9/2003 | Clark et al. |
| 6,622,414 B1 | 9/2003 | Oliver et al. |
| 6,631,580 B2 | 10/2003 | Iafrate |
| 6,631,668 B1 | 10/2003 | Wilson et al. |
| 6,650,669 B1 | 11/2003 | Adkins |
| 6,671,991 B1 | 1/2004 | Danielson |
| 6,682,350 B2 | 1/2004 | Kehl |
| D487,791 S | 3/2004 | Freed |
| 6,742,299 B2 | 6/2004 | Strand |
| 6,749,075 B2 | 6/2004 | Bourque |
| 6,782,789 B2 | 8/2004 | McNulty |
| 6,804,907 B1 | 10/2004 | Slobodkin |
| 6,843,478 B1 | 1/2005 | Hoepelman |
| 6,854,205 B2 | 2/2005 | Wikle et al. |
| 6,860,053 B2 | 3/2005 | Christiansen |
| 6,931,775 B2 | 8/2005 | Burnett |
| 6,935,864 B2 | 8/2005 | Shechter et al. |
| 6,945,782 B2 | 9/2005 | Isoz |
| 6,966,775 B1 | 11/2005 | Kendir et al. |
| 7,032,342 B2 | 4/2006 | Pikielny |
| 7,049,575 B2 | 5/2006 | Hotelling |
| 7,111,424 B1 | 9/2006 | Moody et al. |
| 7,117,624 B2 | 10/2006 | Kim |
| 7,121,034 B2 | 10/2006 | Keng |
| 7,134,234 B1 | 11/2006 | Makarounis |
| 7,191,557 B2 | 3/2007 | Gablowski et al. |
| D542,446 S | 5/2007 | DiCarlo et al. |
| 7,218,501 B2 | 5/2007 | Keely |
| 7,237,352 B2 | 7/2007 | Keely et al. |
| 7,243,454 B1 | 7/2007 | Cahill |
| 7,260,910 B2 | 8/2007 | Danielson |
| 7,264,369 B1 | 9/2007 | Howe |
| 7,303,306 B2 | 12/2007 | Ross et al. |
| 7,305,790 B2 | 12/2007 | Kay |
| 7,325,352 B2 | 2/2008 | Matthews et al. |
| 7,329,127 B2 | 2/2008 | Kendir et al. |
| 7,331,137 B2 | 2/2008 | Hsu |
| D567,894 S | 4/2008 | Sterling et al. |
| 7,360,333 B2 | 4/2008 | Kim |
| D570,948 S | 6/2008 | Cerovic et al. |
| 7,387,052 B2 | 6/2008 | Chang |
| RE40,429 E | 7/2008 | Oliver et al. |
| 7,409,770 B2 | 8/2008 | Jones |
| D578,599 S | 10/2008 | Cheng |
| 7,438,430 B2 | 10/2008 | Kim |
| 7,441,364 B2 | 10/2008 | Rogers et al. |
| 7,453,918 B2 | 11/2008 | Laughman et al. |
| 7,454,858 B2 | 11/2008 | Griffin |
| 7,464,495 B2 | 12/2008 | Cahill |
| 7,472,830 B2 | 1/2009 | Danielson |
| D586,874 S | 2/2009 | Moody et al. |
| 7,490,429 B2 | 2/2009 | Moody et al. |
| 7,505,119 B2 | 3/2009 | Rogers et al. |
| 7,578,089 B1 | 8/2009 | Griffin |
| 7,584,569 B2 | 9/2009 | Kallio |
| 7,591,098 B2 | 9/2009 | Matthews et al. |
| D602,109 S | 10/2009 | Cerovic et al. |
| 7,603,997 B2 | 10/2009 | Hensel et al. |
| D603,478 S | 11/2009 | Hughes |
| 7,624,528 B1 | 12/2009 | Bell et al. |
| 7,627,976 B1 | 12/2009 | Olson |
| 7,644,530 B2 | 1/2010 | Scherpf |
| 7,652,216 B2 | 1/2010 | Sharrah et al. |
| D612,756 S | 3/2010 | D'Amelio et al. |
| D612,757 S | 3/2010 | D'Amelio et al. |
| 7,674,003 B2 | 3/2010 | Sharrah et al. |
| 7,676,975 B2 | 3/2010 | Phillips et al. |
| 7,685,756 B2 | 3/2010 | Moody et al. |
| 7,698,847 B2 | 4/2010 | Griffin |
| 7,703,719 B1 | 4/2010 | Bell et al. |
| 7,712,241 B2 | 5/2010 | Teetzel et al. |
| D616,957 S | 6/2010 | Rievley et al. |
| 7,726,059 B2 | 6/2010 | Pikielny |
| 7,726,061 B1 | 6/2010 | Thummel |
| 7,730,820 B2 | 6/2010 | Vice et al. |
| 7,743,546 B2 | 6/2010 | Keng |
| 7,743,547 B2 | 6/2010 | Houde-Walter |
| 7,753,549 B2 | 7/2010 | Solinsky et al. |
| 7,771,077 B2 | 8/2010 | Miller |
| 7,797,843 B1 | 9/2010 | Scott et al. |
| 7,805,876 B1 | 10/2010 | Danielson et al. |
| 7,818,910 B2 | 10/2010 | Young |
| 7,827,726 B2 | 11/2010 | Stokes |
| 7,841,120 B2 | 11/2010 | Teetzel et al. |
| 7,880,100 B2 | 2/2011 | Sharrah et al. |
| 7,900,390 B2 | 3/2011 | Moody et al. |
| 7,913,439 B2 | 3/2011 | Whaley |
| D636,049 S | 4/2011 | Hughes et al. |
| D636,837 S | 4/2011 | Hughes et al. |

(56) References Cited

U.S. PATENT DOCUMENTS

| | | |
|---|---|---|
| 7,921,591 B1 | 4/2011 | Adcock |
| 7,926,218 B2 | 4/2011 | Matthews et al. |
| 7,997,023 B2 | 8/2011 | Moore et al. |
| 8,001,715 B2 | 8/2011 | Stokes |
| 8,006,427 B2 | 8/2011 | Blevins et al. |
| 8,006,428 B2 | 8/2011 | Moore et al. |
| 8,028,460 B2 | 10/2011 | Williams |
| 8,028,461 B2 | 10/2011 | NuDyke |
| 8,050,307 B2 | 11/2011 | Day et al. |
| 8,056,277 B2 | 11/2011 | Griffin |
| 8,093,992 B2 | 1/2012 | Jancie et al. |
| 8,100,694 B2 | 1/2012 | Portoghese |
| 8,104,220 B2 | 1/2012 | Cobb |
| D653,798 S | 2/2012 | Janice et al. |
| 8,109,024 B2 | 2/2012 | Abst |
| 8,110,760 B2 | 2/2012 | Sharrah et al. |
| 8,127,485 B2 | 3/2012 | Moore |
| 8,132,352 B2 | 3/2012 | Lippard |
| 8,132,354 B1 | 3/2012 | Sellers et al. |
| 8,136,284 B2 | 3/2012 | Moody et al. |
| 8,141,288 B2 | 3/2012 | Dodd et al. |
| 8,146,282 B2 | 4/2012 | Cabahug et al. |
| 8,147,304 B2 | 4/2012 | Yamada |
| 8,151,504 B1 | 4/2012 | Aiston |
| 8,151,505 B2 | 4/2012 | Thompson |
| 8,166,694 B2 | 5/2012 | Swan |
| 8,172,139 B1 | 5/2012 | McDonald et al. |
| 8,182,109 B2 | 5/2012 | Matthews et al. |
| D661,366 S | 6/2012 | Zusman |
| 8,196,328 B2 | 6/2012 | Simpkins |
| 8,215,047 B2 | 7/2012 | Ash et al. |
| 8,225,542 B2 | 7/2012 | Houde-Walter |
| 8,225,543 B2 | 7/2012 | Moody et al. |
| 8,245,428 B2 | 8/2012 | Griffin |
| 8,245,434 B2 | 8/2012 | Hogg et al. |
| 8,256,154 B2 | 9/2012 | Danielson et al. |
| 8,258,416 B2 | 9/2012 | Sharrah et al. |
| D669,552 S | 10/2012 | Essig et al. |
| D669,553 S | 10/2012 | Hughes et al. |
| D669,957 S | 10/2012 | Hughes et al. |
| D669,958 S | 10/2012 | Essig et al. |
| D669,959 S | 10/2012 | Johnston et al. |
| D670,785 S | 11/2012 | Fitzpatrick et al. |
| 8,312,666 B2 | 11/2012 | Moore et al. |
| D672,005 S | 12/2012 | Hedeen et al. |
| 8,322,064 B2 | 12/2012 | Cabahug et al. |
| 8,335,413 B2 | 12/2012 | Dromaretsky et al. |
| D674,861 S | 1/2013 | Johnston et al. |
| D674,862 S | 1/2013 | Johnston et al. |
| D675,281 S | 1/2013 | Speroni |
| 8,341,868 B2 | 1/2013 | Zusman |
| 8,347,541 B1 | 1/2013 | Thompson |
| 8,356,543 B2 | 1/2013 | Rosol et al. |
| 8,356,818 B2 | 1/2013 | Mraz |
| 8,360,598 B2 | 1/2013 | Sharrah et al. |
| D676,097 S | 2/2013 | Izumi |
| 8,365,456 B1 | 2/2013 | Shepard |
| D677,433 S | 3/2013 | Swan et al. |
| D678,976 S | 3/2013 | Pittman |
| 8,387,294 B2 | 3/2013 | Bolden |
| 8,393,104 B1 | 3/2013 | Moody et al. |
| 8,393,105 B1 | 3/2013 | Thummel |
| 8,397,418 B2 | 3/2013 | Cabahug et al. |
| 8,402,683 B2 | 3/2013 | Cabahug et al. |
| 8,413,362 B2 | 4/2013 | Houde-Walter |
| D682,977 S | 5/2013 | Thummel et al. |
| 8,443,539 B2 | 5/2013 | Cabahug et al. |
| 8,444,291 B2 | 5/2013 | Swan et al. |
| 8,448,368 B2 | 5/2013 | Cabahug et al. |
| 8,458,944 B2 | 6/2013 | Houde-Walter |
| 8,464,451 B2 | 6/2013 | McRae |
| 8,467,430 B2 | 6/2013 | Caffey et al. |
| 8,468,734 B2 | 6/2013 | Meller et al. |
| 8,468,930 B1 | 6/2013 | Bell |
| D687,120 S | 7/2013 | Hughes et al. |
| 8,480,329 B2 | 7/2013 | Fluhr et al. |
| 8,484,880 B1 | 7/2013 | Sellers et al. |
| 8,484,882 B2 | 7/2013 | Haley et al. |
| 8,485,686 B2 | 7/2013 | Swan et al. |
| 8,510,981 B1 | 8/2013 | Ganther et al. |
| 8,516,731 B2 | 8/2013 | Cabahug et al. |
| 8,567,981 B2 | 10/2013 | Finnegan et al. |
| 8,584,587 B2 | 11/2013 | Uhr |
| 8,607,495 B2 | 12/2013 | Moore et al. |
| D697,162 S | 1/2014 | Faifer |
| D697,163 S | 1/2014 | Bietsch |
| 8,646,201 B2 | 2/2014 | Hughes |
| 8,661,725 B1 | 3/2014 | Ganther et al. |
| 8,662,694 B1 | 3/2014 | Izumi et al. |
| 8,734,156 B2 | 5/2014 | Uhr |
| 8,739,447 B2 | 6/2014 | Merritt et al. |
| D709,585 S | 7/2014 | Klecker |
| D710,966 S | 8/2014 | Barfoot |
| 8,807,779 B1 | 8/2014 | Izumi et al. |
| 8,813,411 B2 | 8/2014 | Moore et al. |
| 8,844,189 B2 | 9/2014 | Moore et al. |
| D720,423 S | 12/2014 | Barfoot |
| 8,915,009 B2 | 12/2014 | Caulk |
| 8,919,023 B2 | 12/2014 | Merritt et al. |
| 8,927,083 B2 | 1/2015 | Pell |
| 8,938,904 B1 | 1/2015 | Sellers et al. |
| D722,125 S | 2/2015 | Zayatz |
| 8,944,626 B2 | 2/2015 | Matthews et al. |
| 8,944,838 B2 | 2/2015 | Mulfinger |
| 8,991,093 B1 | 3/2015 | Calvert |
| 9,011,279 B2 | 4/2015 | Johnson et al. |
| 9,023,459 B2 | 5/2015 | Hogue |
| 9,146,077 B2 | 9/2015 | Moore |
| 9,182,194 B2 | 11/2015 | Moore |
| 9,188,407 B2 | 11/2015 | Moore |
| 9,243,865 B1 | 1/2016 | Bruhns |
| 9,272,402 B2 | 3/2016 | Hu |
| 9,297,614 B2 | 3/2016 | Moore |
| 9,453,702 B2 | 9/2016 | Bruhns |
| 9,644,826 B2 | 5/2017 | Moore |
| 9,658,031 B1 | 5/2017 | Hedeen |
| 9,772,163 B2 | 9/2017 | Sharrah et al. |
| 9,777,984 B1 | 10/2017 | Bovine |
| 9,791,240 B2 | 10/2017 | Bruhns |
| D802,704 S | 11/2017 | Planck |
| 9,810,411 B2 | 11/2017 | Galli |
| 9,829,280 B1 | 11/2017 | Moore et al. |
| 9,841,254 B2 | 12/2017 | Moore et al. |
| 9,915,508 B2 | 3/2018 | Moore et al. |
| 9,982,963 B2 | 5/2018 | Johnson |
| 10,113,836 B2 | 10/2018 | Moore et al. |
| 2001/0042335 A1 | 11/2001 | Strand |
| 2002/0009694 A1 | 1/2002 | Rosa |
| 2002/0051953 A1 | 5/2002 | Clark et al. |
| 2002/0057719 A1 | 5/2002 | Shechter |
| 2002/0073561 A1 | 6/2002 | Liao |
| 2002/0104249 A1 | 8/2002 | Lin |
| 2002/0129536 A1 | 9/2002 | Iafrate et al. |
| 2002/0134000 A1 | 9/2002 | Varshneya et al. |
| 2002/0148153 A1 | 10/2002 | Thorpe |
| 2002/0194767 A1 | 12/2002 | Houde Walter et al. |
| 2003/0003424 A1 | 1/2003 | Shechter et al. |
| 2003/0022135 A1 | 1/2003 | Shechter et al. |
| 2003/0029072 A1 | 3/2003 | Danielson |
| 2003/0084601 A1 | 5/2003 | Kunimoto |
| 2003/0175661 A1 | 9/2003 | Shechter et al. |
| 2003/0180692 A1 | 9/2003 | Skala et al. |
| 2003/0196366 A1 | 10/2003 | Beretta |
| 2004/0003529 A1 | 1/2004 | Danielson |
| 2004/0010956 A1 | 1/2004 | Bubits |
| 2004/0014010 A1 | 1/2004 | Swensen et al. |
| 2004/0064994 A1 | 4/2004 | Luke |
| 2005/0044736 A1 | 3/2005 | Liao |
| 2005/0130739 A1 | 6/2005 | Argentar |
| 2005/0153262 A1 | 7/2005 | Kendir |
| 2005/0185403 A1 | 8/2005 | Diehl |
| 2005/0188588 A1 | 9/2005 | Keng |
| 2005/0241209 A1 | 11/2005 | Staley |
| 2005/0257415 A1 | 11/2005 | Solinsky et al. |

(56) References Cited

U.S. PATENT DOCUMENTS

| | | |
|---|---|---|
| 2005/0268519 A1 | 12/2005 | Pikielny |
| 2006/0162225 A1 | 7/2006 | Danielson |
| 2006/0191183 A1 | 8/2006 | Griffin |
| 2007/0039226 A1 | 2/2007 | Stokes |
| 2007/0041418 A1 | 2/2007 | Laughman et al. |
| 2007/0056203 A1 | 3/2007 | Gering et al. |
| 2007/0113460 A1 | 5/2007 | Potterfield et al. |
| 2007/0190495 A1 | 8/2007 | Kendir et al. |
| 2007/0258236 A1 | 11/2007 | Miller |
| 2007/0271832 A1 | 11/2007 | Griffin |
| 2008/0000133 A1 | 1/2008 | Solinsky et al. |
| 2008/0060248 A1 | 3/2008 | Pine et al. |
| 2008/0134562 A1 | 6/2008 | Teetzel |
| 2009/0013580 A1 | 1/2009 | Houde-Walter |
| 2009/0013581 A1 | 1/2009 | LoRocco |
| 2009/0053679 A1 | 2/2009 | Jones |
| 2009/0178325 A1 | 7/2009 | Veilleux |
| 2009/0183416 A1 | 7/2009 | Danielson |
| 2009/0293335 A1 | 12/2009 | Danielson |
| 2009/0293855 A1 | 12/2009 | Danielson |
| 2009/0323733 A1 | 12/2009 | Charkas |
| 2010/0038854 A1* | 2/2010 | Mraz ................ F41J 5/041 273/371 |
| 2010/0058640 A1 | 3/2010 | Moore et al. |
| 2010/0162610 A1 | 7/2010 | Moore et al. |
| 2010/0175297 A1 | 7/2010 | Speroni |
| 2010/0227298 A1 | 9/2010 | Charles |
| 2010/0229448 A1 | 9/2010 | Houde-Walter |
| 2010/0263254 A1 | 10/2010 | Glock |
| 2010/0275496 A1 | 11/2010 | Solinsky et al. |
| 2011/0047850 A1 | 3/2011 | Rievley et al. |
| 2011/0061283 A1 | 3/2011 | Cavallo |
| 2011/0074303 A1 | 3/2011 | Stokes |
| 2011/0119868 A1 | 5/2011 | LaLonde |
| 2011/0154712 A1 | 6/2011 | Moore |
| 2011/0162249 A1 | 7/2011 | Woodmansee et al. |
| 2011/0162251 A1 | 7/2011 | Houde-Walter |
| 2011/0185619 A1 | 8/2011 | Finnegan et al. |
| 2011/0225867 A1 | 9/2011 | Moore |
| 2012/0005938 A1 | 1/2012 | Sloan |
| 2012/0047787 A1 | 3/2012 | Curry |
| 2012/0055061 A1 | 3/2012 | Hartley et al. |
| 2012/0110886 A1 | 5/2012 | Moore et al. |
| 2012/0124885 A1 | 5/2012 | Caulk et al. |
| 2012/0129136 A1 | 5/2012 | Dvorak |
| 2012/0144716 A1 | 6/2012 | Cabahug et al. |
| 2012/0144718 A1 | 6/2012 | Danielson |
| 2012/0180366 A1 | 7/2012 | Jaroh et al. |
| 2012/0180367 A1 | 7/2012 | Singh |
| 2012/0180370 A1 | 7/2012 | McKinley |
| 2012/0224357 A1 | 9/2012 | Moore |
| 2012/0224387 A1 | 9/2012 | Moore |
| 2012/0268920 A1 | 10/2012 | Matthews |
| 2013/0017515 A1* | 1/2013 | Moore ................ F42B 8/02 434/21 |
| 2013/0185978 A1 | 7/2013 | Dodd et al. |
| 2013/0185982 A1 | 7/2013 | Hilbourne et al. |
| 2013/0205635 A1 | 8/2013 | Hines |
| 2013/0263492 A1 | 10/2013 | Erdle |
| 2013/0318851 A1 | 12/2013 | Diamond |
| 2014/0007485 A1 | 1/2014 | Castejon |
| 2014/0109457 A1 | 4/2014 | Speroni |
| 2014/0157645 A1 | 6/2014 | Moore |
| 2014/0176463 A1 | 6/2014 | Donahoe |
| 2014/0256481 A1 | 9/2014 | Flint |
| 2014/0355258 A1 | 12/2014 | Izumi et al. |
| 2015/0192391 A1 | 7/2015 | Moore |
| 2015/0226508 A1 | 8/2015 | Hughes |
| 2015/0233668 A1 | 8/2015 | Moore |
| 2015/0283459 A1 | 10/2015 | Condon |
| 2015/0308670 A1 | 10/2015 | Moore |
| 2015/0345905 A1 | 12/2015 | Hancosky |
| 2015/0348330 A1 | 12/2015 | Balachandreswaran |
| 2016/0059136 A1 | 3/2016 | Ferris |
| 2016/0084618 A1 | 3/2016 | Hong |
| 2016/0091285 A1 | 3/2016 | Mason |
| 2016/0161220 A1 | 6/2016 | Moore |
| 2016/0169608 A1 | 6/2016 | Schulz |
| 2016/0195366 A1 | 7/2016 | Kowalczyk et al. |
| 2016/0209170 A1 | 7/2016 | Mock et al. |
| 2016/0209174 A1 | 7/2016 | Hartley et al. |
| 2016/0245617 A1 | 8/2016 | Moore |
| 2016/0305748 A1 | 10/2016 | Moore |
| 2017/0003103 A1 | 1/2017 | Moore |
| 2017/0030677 A1 | 2/2017 | Faifer |
| 2017/0082399 A1 | 3/2017 | Moore |
| 2017/0153095 A1 | 6/2017 | Moore |
| 2017/0160054 A1 | 6/2017 | Moore |
| 2017/0205182 A1 | 7/2017 | Hughes et al. |
| 2018/0023923 A1 | 1/2018 | Uhr |
| 2018/0058804 A1 | 3/2018 | Moore |
| 2018/0135944 A1 | 5/2018 | Moore |
| 2018/0149443 A1 | 5/2018 | Dottle |

OTHER PUBLICATIONS

USPTO; Notice of Allowance and Fees Due dated Jul. 31, 2017 in U.S. Appl. No. 15/166,145.
USPTO; Non-Final Office Action dated Aug. 24, 2017 in U.S. Appl. No. 15/253,543.
USPTO; Supplemental Notice of Allowance dated Sep. 13, 2017 in U.S. Appl. No. 15/166,145.
USPTO; Final Office Action dated Sep. 28, 2017 in U.S. Appl. No. 15/243,813.
USPTO; Notice of Allowance dated Oct. 27, 2017 in U.S. Appl. No. 14/955,440.
USPTO; Notice of Allowance dated Nov. 13, 2017 in U.S. Appl. No. 14/955,440.
USPTO; Office Action dated Feb. 24, 2017 in U.S. Appl. No. 15/166/145.
USPTO; Notice of Allowance dated Mar. 7, 2017 in U.S. Appl. No. 14/630,467.
USPTO; Non-Final Office Action dated Dec. 7, 2017 in U.S. Appl. No. 15/075,769.
USPTO; Non-Final Office Action dated Dec. 18, 2017 in U.S. Appl. No. 15/787,134.
USPTO; Final Office Action dated Jan. 16, 2018 in U.S. Appl. No. 14/963,475.
USPTO; Final Office Action dated Feb. 7, 2018 in U.S. Appl. No. 15/253,543.
USPTO; Non-Final Office Action dated Feb. 8, 2018 in U.S. Appl. No. 14/863,304.
USPTO; Non-Final Office Action dated Feb. 26, 2018 in U.S. Appl. No. 15/804,229.
USPTO; Non-Final Office Action dated Aug. 30, 2016 in U.S. Appl. No. 14/955,440.
UPSTO; Non-Final Office Action dated Oct. 6, 2016 in U.S. Appl. No. 15/243,813.
USPTO; Notice of Allowance dated Apr. 26, 2017 in U.S. Appl. No. 15/130,744.
EPO; Office Action dated Oct. 5, 2011 in Serial No. 09169459.
EPO; Office Action dated Oct. 5, 2011 in Serial No. 09169469.
EPO; Office Action dated Dec. 20, 2011 in Application No. 09169476.
EPO; Office Action dated Sep. 3, 2012 in Application No. 09169469.
EPO; Office Action dated Sep. 3, 2012 in Application No. 09169476.
EPO; Office Action dated Sep. 3, 2012 in Application No. 09169459.
EPO; Search Opinion and Report dated Aug. 6, 2010 in Serial No. 09169459.
EPO; Search Opinion and Report dated Aug. 6, 2010 in Serial No. 09169469.
EPO; Search Opinion and Report dated Aug. 23, 2010 in Serial No. 09169476.
EPO; Search Report and Opinion dated Aug. 6, 2012 in U.S. Appl. No. 11/151,504.
USPTO; Advisory Action dated Aug. 22, 2011 in U.S. Appl. No. 12/249,781.
USPTO; Advisory Action dated Jul. 13, 2012 in U.S. Appl. No. 12/249,781.

(56) References Cited

OTHER PUBLICATIONS

USPTO; Final Office Action dated Feb. 24, 2010 in U.S. Appl. No. 11/317,647.
USPTO; Final Office Action dated Mar. 6, 2012 in U.S. Appl. No. 12/610,213.
USPTO; Final Office Action dated May 2, 2012 in U.S. Appl. No. 12/249,781.
USPTO; Final Office Action dated Jun. 19, 2009 in U.S. Appl. No. 11/317,647.
USPTO; Final Office Action dated May 18, 2011 in U.S. Appl. No. 12/249,781.
USPTO; Final Office Action dated Aug. 7, 2012 in U.S. Appl. No. 12/249,781.
USPTO; Notice of Allowance dated Feb. 2, 2011 in U.S. Appl. No. 12/249,794.
USPTO; Notice of Allowance dated Feb. 26, 2002 in U.S. Appl. No. 09/624,124.
USPTO; Notice of Allowance dated Mar. 3, 2011 in U.S. Appl. No. 12/249,785.
USPTO; Notice of Allowance dated May 13, 2011 in U.S. Appl. No. 12/249,785.
USPTO; Notice of Allowance dated May 17, 2011 in U.S. Appl. No. 13/077,861.
USPTO; Notice of Allowance dated Jul. 8, 2011 in U.S. Appl. No. 12/249,794.
USPTO; Notice of Allowance dated Sep. 1, 2011 in U.S. Appl. No. 13/077,861.
USPTO; Notice of Allowance dated Nov. 1, 2011 in U.S. Appl. No. 13/077,875.
USPTO; Notice of Allowance dated Nov. 18, 2011 in U.S. Appl. No. 13/077,861.
USPTO; Notice of Allowance dated Jul. 25, 2012 in U.S. Appl. No. 12/610,213.
USPTO; Notice of Allowance dated Aug. 16, 2012 in U.S. Appl. No. 13/346,621.
USPTO; Office Action dated Jan. 26, 2012 in U.S. Appl. No. 12/249,781.
USPTO; Office Action dated Sep. 28, 2009 in U.S. Appl. No. 11/317,647.
USPTO; Office Action dated Oct. 6, 2010 in U.S. Appl. No. 12/249,794.
USPTO; Office Action dated Oct. 18, 2011 in U.S. Appl. No. 12/610,213.
USPTO; Office Action dated Nov. 8, 2010 in U.S. Appl. No. 12/249,781.
USPTO; Office Action dated Dec. 26, 2008 in U.S. Appl. No. 11/317,647.
USPTO; Office Action dated Jun. 11, 2001 in U.S. Appl. No. 09/624,124.
USPTO; Office Action dated Jun. 22, 2011 in U.S. Appl. No. 13/077,875.
USPTO; Office Action dated Nov. 15, 2012 in U.S. Appl. No. 13/412,385.
USPTO; Office Action dated Feb. 1, 2013 in U.S. Appl. No. 12/249,781.
USPTO; Office Action dated Feb. 20, 2013 in U.S. Appl. No. 13/670,278.
USPTO; Office Action dated Mar. 26, 2013 in U.S. Appl. No. 13/353,241.
USPTO; Final Office Action dated Sep. 24, 2013 in U.S. Appl. No. 13/353,241.
USPTO; Office Action dated Jan. 31, 2014 in U.S. Appl. No. 13/353,241.
USPTO; Final Office Action dated Sep. 10, 2014 in U.S. Appl. No. 13/353,241.
USPTO; Office Action dated Oct. 23, 2012 in U.S. Appl. No. 13/010,649.
USPTO; Final Office Action dated Apr. 11, 2013 in U.S. Appl. No. 13/010,649.
USPTO; Final Office Action dated May 16, 2013 in U.S. Appl. No. 13/412,385.
USPTO; Office Action dated Jun. 17, 2013 in U.S. Appl. No. 13/353,301.
USPTO; Notice of Allowance dated Jan. 18, 2012 in U.S. Appl. No. 13/353,301.
USPTO; Office Action dated Jun. 19, 2013 in U.S. Appl. No. 13/353,165.
USPTO; Final Office Action dated Jul. 29, 2014 in U.S. Appl. No. 13/353,165.
USPTO; Office Action dated Nov. 20, 2014 in U.S. Appl. No. 13/353,165.
USPTO; Notice of Allowance dated Jun. 5, 2015 in U.S. Appl. No. 13/353,165.
USPTO; Notice of Allowance dated Jul. 24, 2015 in U.S. Appl. No. 13/353,165.
USPTO; Final Office Action dated Jun. 24, 2013 in U.S. Appl. No. 13/670,278.
USPTO; Office Action dated Dec. 11, 2013 in U.S. Appl. No. 13/670,278.
USPTO; Notice of Allowance dated Apr. 25, 2014 in U.S. Appl. No. 13/670,278.
USPTO; Notice of Allowance dated Jul. 15, 2013 in U.S. Appl. No. 13/412,385.
USPTO; Office Action dated Nov. 4, 2013 in U.S. Appl. No. 13/412,385.
USPTO; Final Office Action dated Mar. 27, 2014 in U.S. Appl. No. 13/412,385.
USPTO; Office Action dated Sep. 30, 2014 in U.S. Appl. No. 13/412,385.
USPTO; Notice of Allowance dated Aug. 6, 2013 in U.S. Appl. No. 13/010,649.
USPTO; Notice of Allowance dated Jul. 22, 2013 in U.S. Appl. No. 12/249,781.
USPTO; Decision on Appeal dated Aug. 20, 2013 in U.S. Appl. No. 11/317,647.
USPTO; Office Action dated Jan. 27, 2014 in U.S. Appl. No. 13/707,312.
USPTO; Notice of Allowance dated Jun. 11, 2014 in U.S. Appl. No. 13/707,312.
USPTO; Notice of Allowance dated Jul. 7, 2015 in U.S. Appl. No. 14/182,140.
USPTO; Office Action dated Aug. 19, 2014 in U.S. Appl. No. 14/316,688.
USPTO; Final Office Action dated Jan. 27, 2015 in U.S. Appl. No. 14/316,688.
USPTO; Notice of Allowance dated Jun. 24, 2015 in U.S. Appl. No. 14/316,688.
USPTO; Office Action dated Mar. 3, 2015 in U.S. Appl. No. 14/278,315.
USPTO; Notice of Allowance dated Jun. 24, 2015 in U.S. Appl. No. 14/278,315.
USPTO; Office Action dated Jul. 2, 2015 in U.S. Appl. No. 14/459,274.
USPTO; Notice of Allowance dated Nov. 24, 2015 in U.S. Appl. No. 14/459,274.
USPTO; Notice of Allowance dated Nov. 15, 2016 in U.S. Appl. No. 14/630,467.
Webpage print out from http://airgunexpress.com/Accessories/ referencing various level devices.
Webpage print out from http://secure.armorholdings.com/b-square/smarthtml/about.html referencing background on B-Square and their firearm accessories.
Webpage print out from http://secure.armorholdings.com/b-square/tools_scope.html referencing scope and site tools offered by B-Square.
Webpage print out from www.battenfeldtechnologies.com/113088.html referencing a level device.
Webpage print out from www.battenfeldtechnologies.com/wheeler referencing products from Wheeler Engineering.
Webpage print out from www.blackanddecker.com/laserline/lasers.aspx referencing Black & Decker's Auto-Leveling Lasers.

(56) References Cited

OTHER PUBLICATIONS

Webpage print out from www.laserlevel.co.uk/newsite.index.asp referencing the laser devices available on the Laserlevel Online Store.
Shooting Illustrated "Update on the .25 SAUM" Jul. 2005 pp. 14-15.
USPTO; Final Office Action dated Aug. 31, 2018 in U.S. Appl. No. 15/804,229.
USPTO; Notice of Allowance dated Aug. 31, 2018 in U.S. Appl. No. 15/075,769.
USPTO; Non-Final Office Action dated Sep. 19, 2018 in U.S. Appl. No. 15/243,813.
USPTO; Notice of Allowance dated Oct. 3, 2018 in U.S. Appl. No. 15/884,122.
USPTO; Advisory Action dated Jun. 14, 2018 in U.S. Appl. No. 15/253,543.
USPTO; Notice of Allowance dated Jun. 20, 2018 in U.S. Appl. No. 15/787,134.
USPTO; Non-Final Office Action dated Jun. 29, 2018 in U.S. Appl. No. 15/600,571.
USPTO; Non-Final Office Action dated Jul. 3, 2018 in U.S. Appl. No. 14/963,475.
USPTO; Notice of Allowance dated Jul. 18, 2018 in U.S. Appl. No. 15/075,769.
USPTO; Non-Final Office Action dated Jul. 20, 2018 in U.S. Appl. No. 15/253,543.
Google Search for crossbow laser, image search conducted on Nov. 29, 2017, 14 pages.
Google Search for crossbow laser, image search conducted on Nov. 29, 2017, 2 pages.
CrossbowNation—Community—Gear Review, Crossbow Laser Boresighter Bolt Video Review, 1 page, printed on Nov. 29, 2017, dated Apr. 18, 2010.
CrossbowNation, Gear Review, Crossbow Laser Boresighter Bolt Video Review, 6 images taken therefrom, 6 pages, printed on Nov. 29, 2017, dated Apr. 18, 2010.
Ducet, "Arsenal Strike One Review," http://dennyducet.blogspot.com/2015/06/the-arsenal-strike-one-innovative.html, (Jun. 18, 2015).
USPTO; Final Office Action dated May 18, 2017 in U.S. Appl. No. 15/243,813.
USPTO; Non-Final Office Action dated Jun. 2, 2017 in U.S. Appl. No. 14/963,475.
USPTO; Requirement for Restriction dated Jun. 5, 2017 in U.S. Appl. No. 14/863,304.
USPTO; Advisory Action dated May 15, 2018 in U.S. Appl. No. 14/963,475.

\* cited by examiner

10,532,275 B2

LASER ACTIVATED MOVING TARGET

CROSS REFERENCE TO RELATED APPLICATIONS

This application claims priority to U.S. Provisional Patent Application No. 62/191,240 entitled LASER TRAINER WITH CHANGING SCREEN, filed on Jul. 10, 2015. This application is also a continuation-in-part of U.S. application Ser. No. 13/353,241 entitled "Laser Trainer Target" filed on Jan. 18, 2012 and U.S. application Ser. No. 14/955,440 entitled "Laser Trainer Target" filed on Dec. 1, 2015. The disclosures of each of the above applications are incorporated herein by reference to the extent they are not inconsistent with this disclosure.

FIELD OF THE INVENTION

The present invention relates to firearm training systems that do not require live ammunition, and that can accommodate one or more players to provide a competition to improve shooting accuracy.

SUMMARY OF THE INVENTION

Conventional firearm training can be dangerous, expensive (considering the prices for ammunition and replacement targets) and can only be performed in certain areas, such as shooting ranges. The present invention allows firearm training to be performed safely, inexpensively, and almost anywhere without the use of live ammunition. The laser trainer target provides a convenient, easy-to use, and inexpensive firearms training option, and preferably operates without the need for an external computer, television or projector.

A laser trainer target according to aspects of the invention records where a laser light (such as the laser emitted from a laser trainer cartridge) hits the target. Among other things, the laser trainer target (or "target") can help save time, money and ammunition (which is expensive), and can help users learn or teach shooting skills, preferably including unsighted fire, accuracy, grouping and trigger control. The laser trainer target helps users to practice shooting skills in a wide range of locations, such as in a house or garage.

The laser trainer target may display hits, and optionally emit a sound, when the target is activated and struck by laser light, or may record only a score when activated and struck by laser light. In one embodiment, a user "shoots" laser light at the target and, to display the hits to the target, shoots and strikes a "display" area on the face of the laser trainer target with laser light. When the user is finished training, he/she simply strikes a "reset" area of the target with laser light, which resets the target so it no longer registers laser light strikes that occurred before the target was reset.

An alternate embodiment is in target 10', which according to aspects of the invention, may enable one or more users to compete by playing a game, such as a simulated dart game, wherein one or more of: the type of game, number of players, starting the game, changing the player, and stopping (or resetting) the game, are all accomplished by striking different areas of the target with laser light. There is no need for a wired or wireless control for these functions, or to approach the target to manually control these functions.

DETAILED DESCRIPTION OF PREFERRED EMBODIMENTS

Laser Trainer Target

Figure 1:
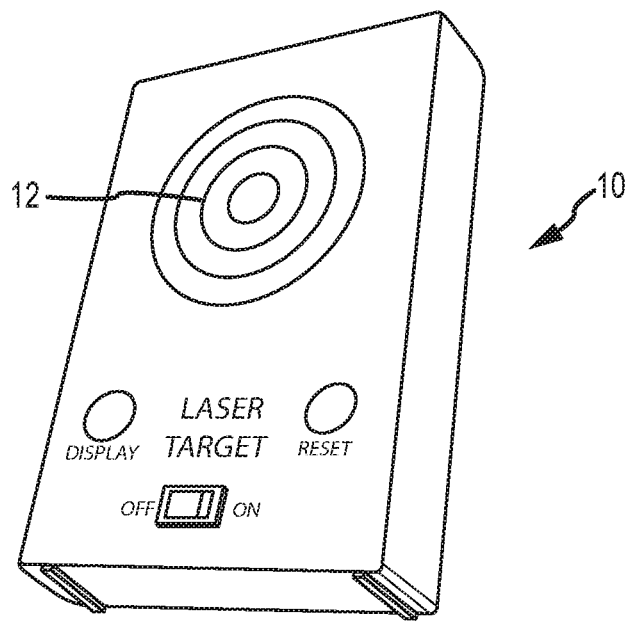
FIGS. 1 and 2 are perspective and frontal views of a laser trainer target according to aspects of the present invention.
Figure 2:
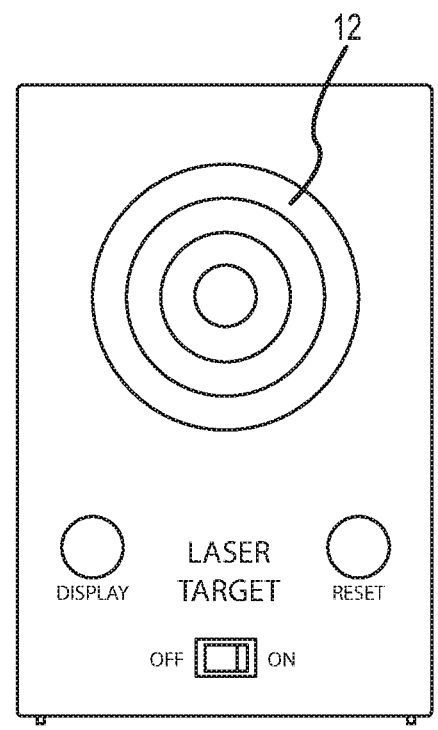

Turning now to the figures, where the purpose is to describe a preferred embodiment of the invention and not to limit same, FIGS. 1 and 2 are perspective and frontal views, respectively, of an exemplary embodiment of a laser trainer target 10 according to various aspects of the invention. The target 10 includes a screen 12 (circular with a bullseye pattern in this embodiment) that allows laser light to pass through it. Behind the screen are a plurality of sensors (e.g., phototransistors) configured to detect when it has been exposed to laser light, and an optical display (e.g., a light-emitting diode) associated with each of the sensors capable of showing where the laser light struck the target when activated.

Figure 3:
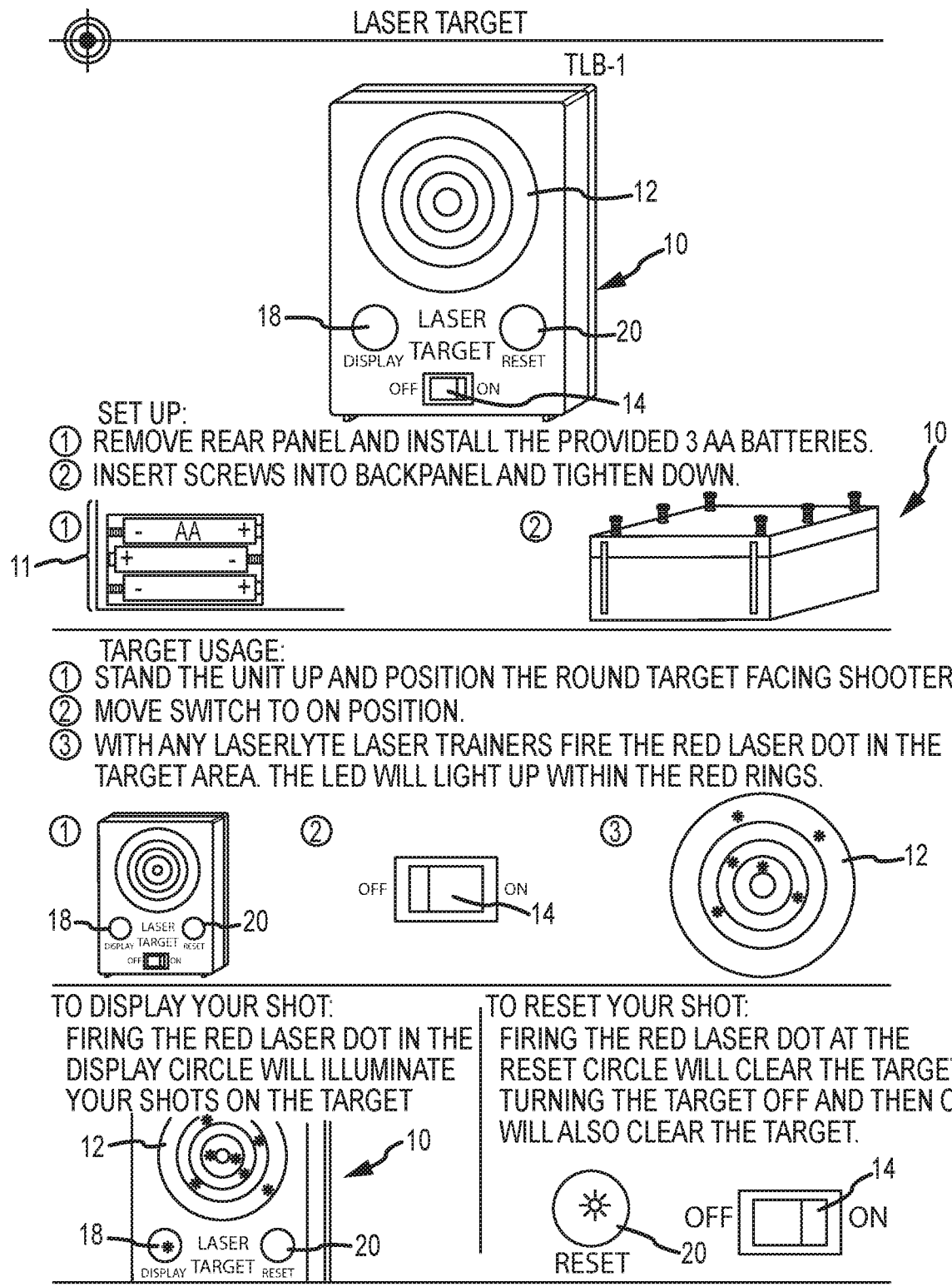
FIG. 3 illustrates various aspects of the target in FIGS. 1 and 2, including how the back of the target can be removed to insert or replace batteries, how the target is used, how impacts of laser light on the target are displayed, and how the target is reset.

The operation of the target of FIGS. 1 and 2 is further shown in FIG. 3. As shown in FIG. 3, the target is battery-powered (using three "AA" batteries) 11, although any suitable power source may be utilized, such as electricity from an outlet in a home, and includes a manual on-off switch 14. This exemplary target 10 also includes a display area 18 and a reset area 20. When the display area 18 is illuminated (or "struck") by a laser light, it activates the display mode, which illuminates the optical display(s) D to indicate where the target 10 was previously struck by laser light. When the reset area 20 is illuminated by laser light, each sensor S that was struck by laser light is reset and each optical display D is turned off. The sensors S are not activated again until struck again by laser light. In this manner, the target 10 can be used and reset over and over.

In this embodiment, the laser trainer target 10 gives the user delayed shooting feedback, so the shooter can concentrate on the next shot instead of visually seeing where the last shot struck. In this embodiment, the three AA batteries 11 can sense and register about 6,000 hits (or "strikes"), and target 10 can sense and register hits by a laser of up to 50 yards away. In alternate embodiments, hits may be displayed as soon as they are registered, and/or the "display," "reset," and "on/off" functions of the target 10 may be controlled via a remote control in communication with the target through a wired or wireless interface.

Figure 4:
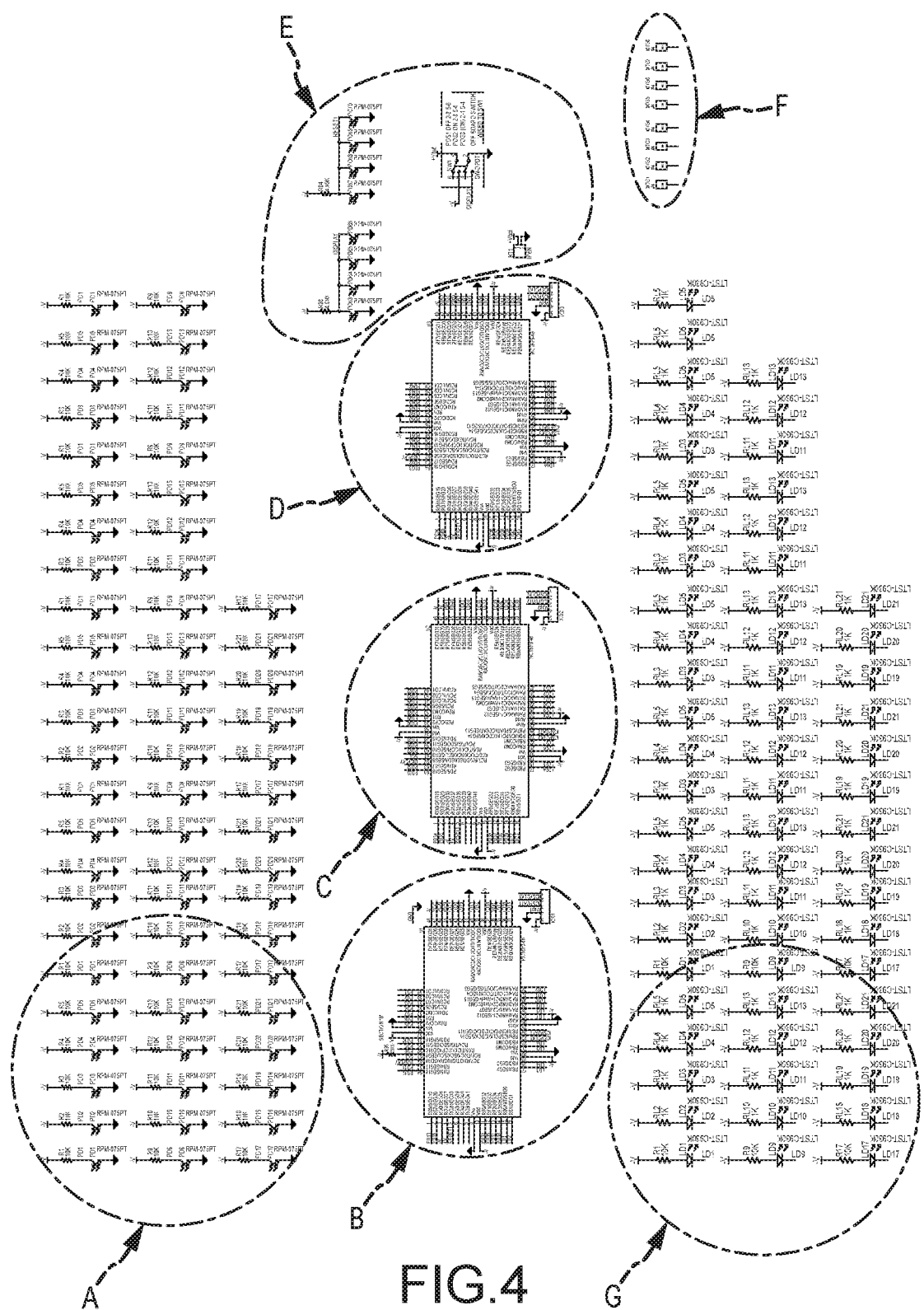
FIG. 4 is a schematic of the components in an exemplary laser training target according to various aspects of the invention.
Figure 5:
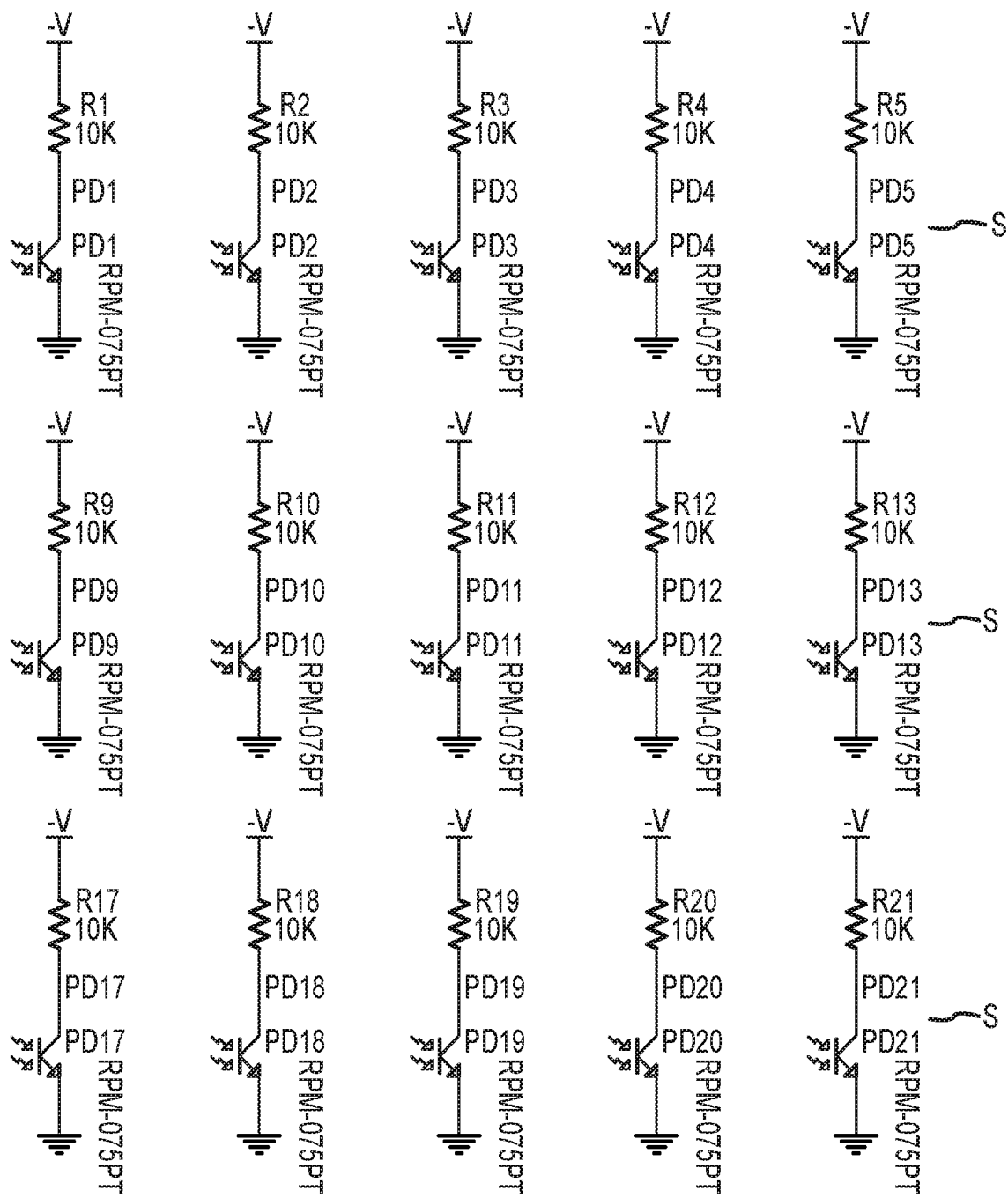
FIG. 5 is a close-up view of section "A" in FIG. 4, showing the circuit diagrams for a portion of the sensors used in the laser training target.
Figure 6:
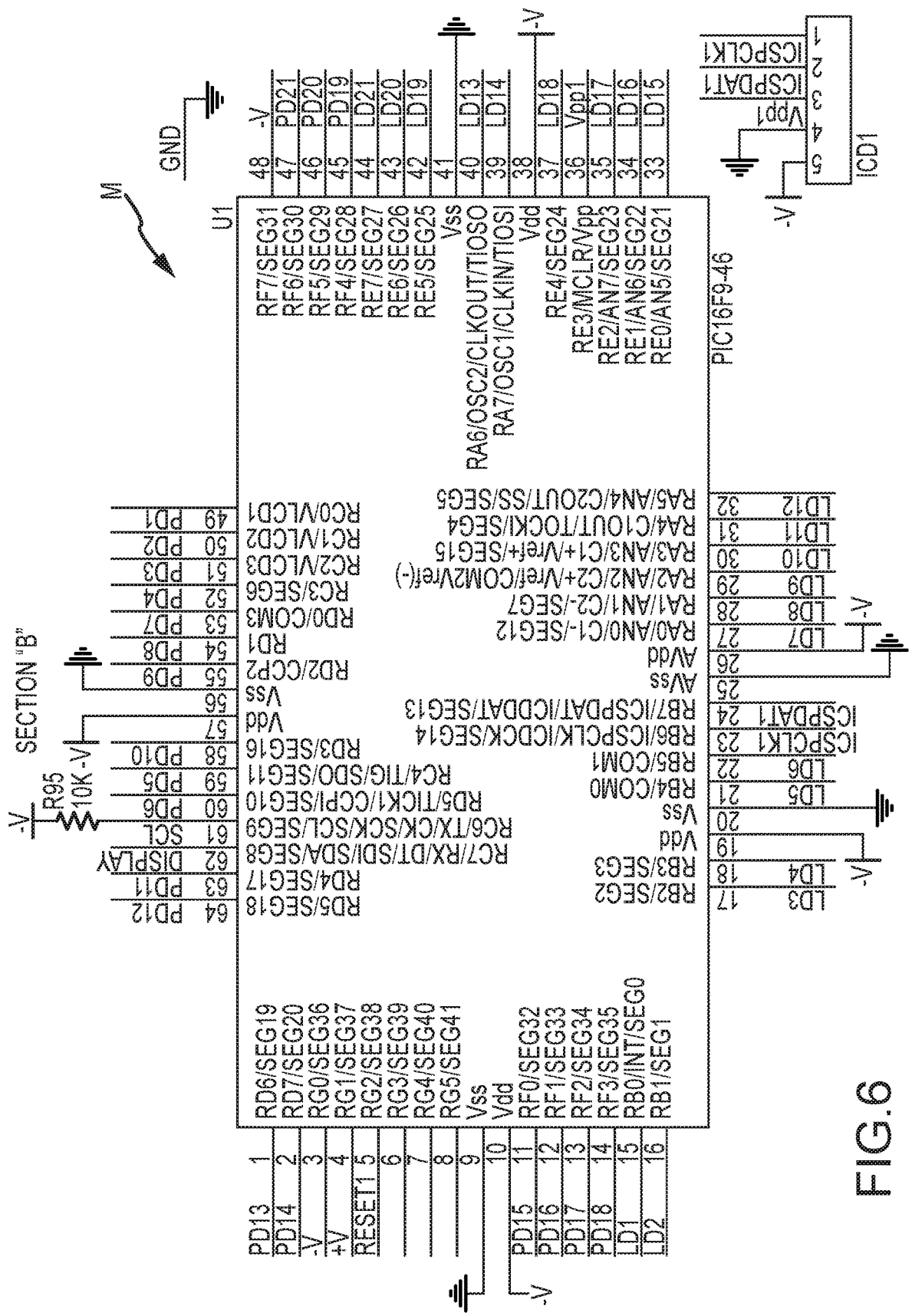
FIGS. 6-8 are close-up views of section "B"-"D", respectively, in FIG. 5, each showing a microcontroller used by the laser training target.
Figure 7:
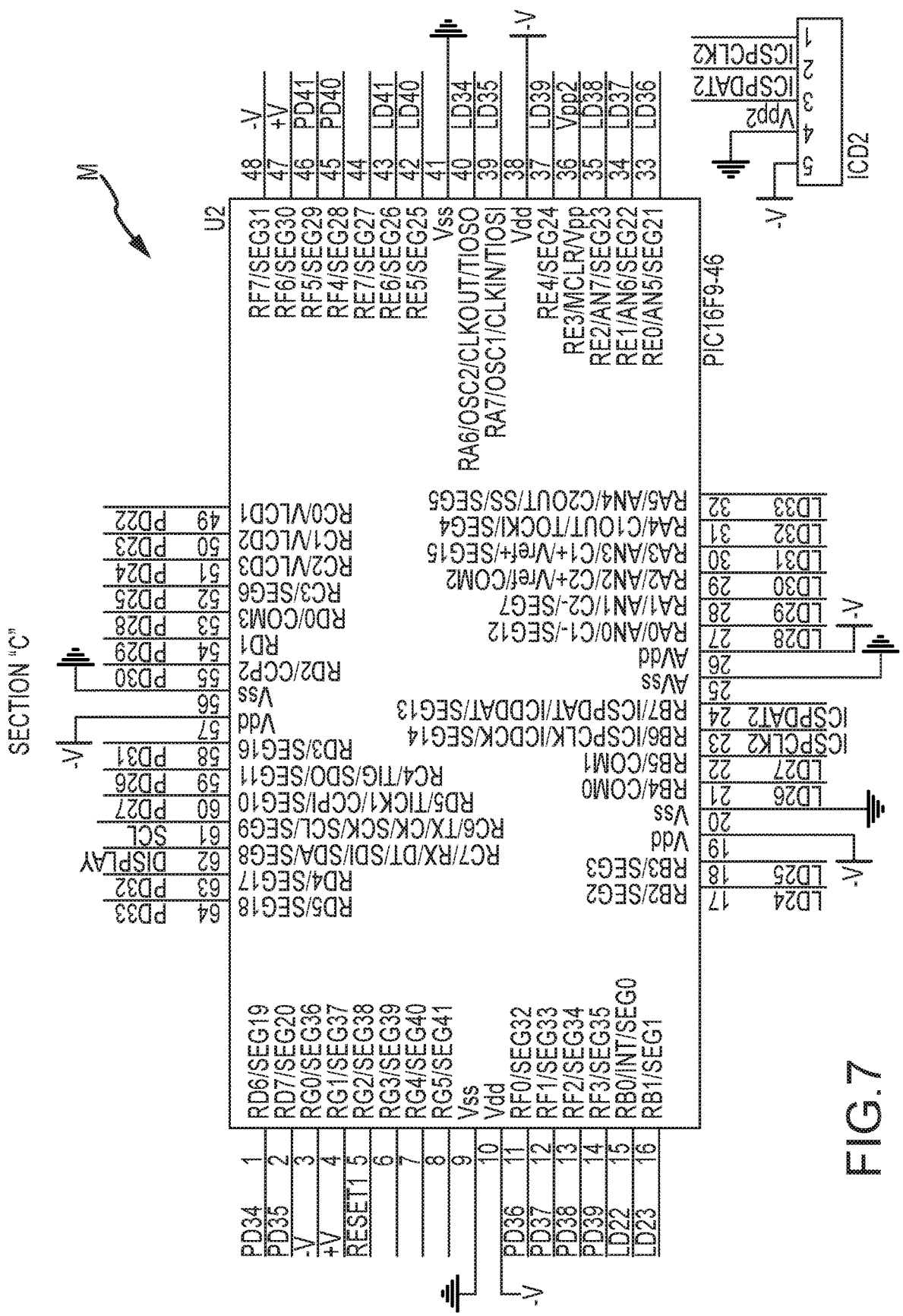
Figure 8:
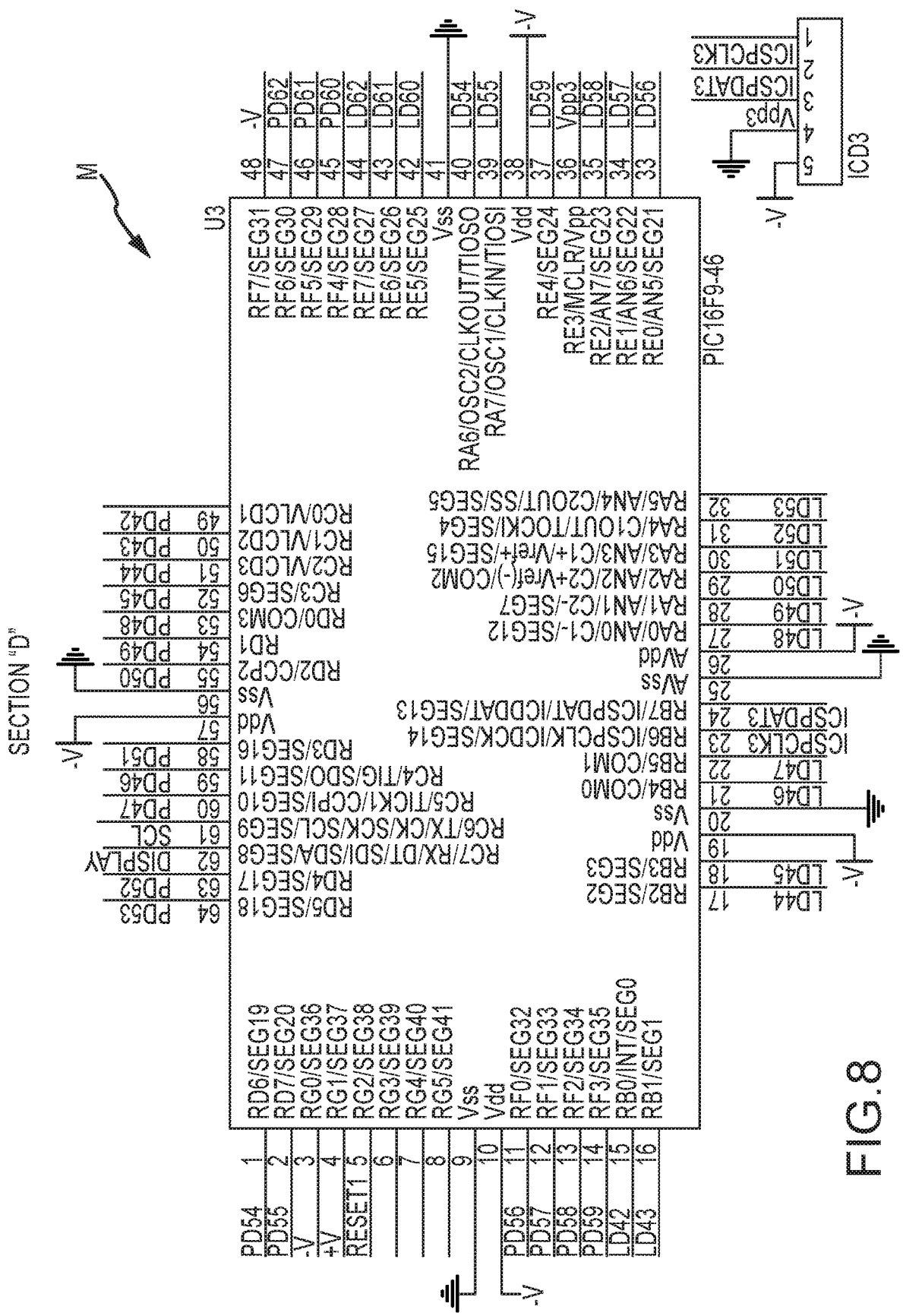
Figure 9:
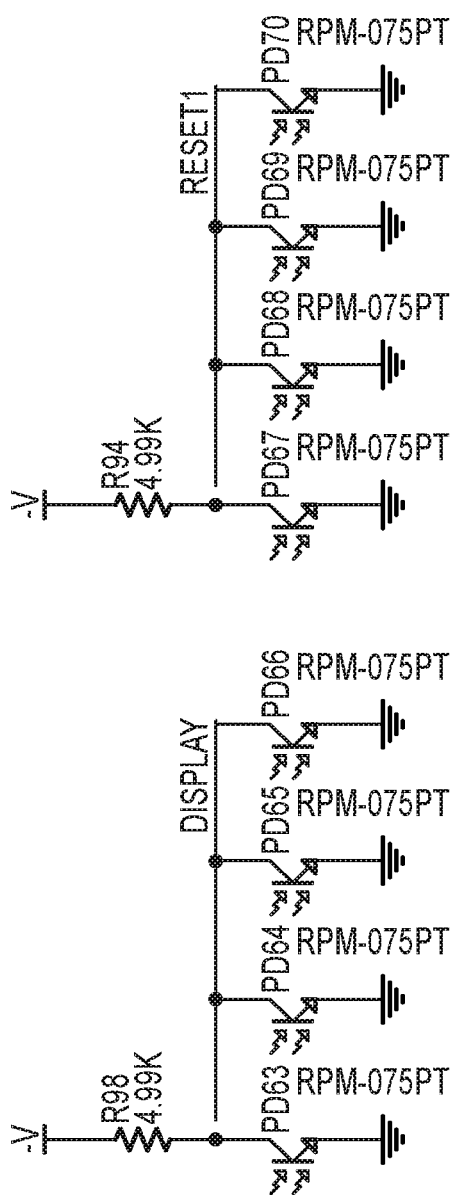
FIG. 9 is a close-up view of section "E" in FIG. 4, showing the circuit diagrams for the "Display" and "Reset" portions of the laser training target.
Figure 9:
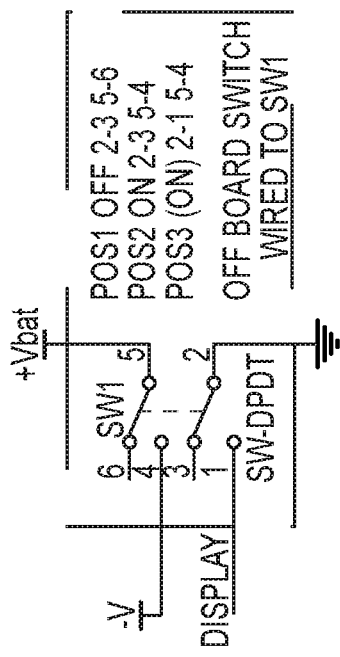
Figure 9:
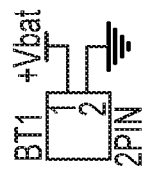
Figure 10:
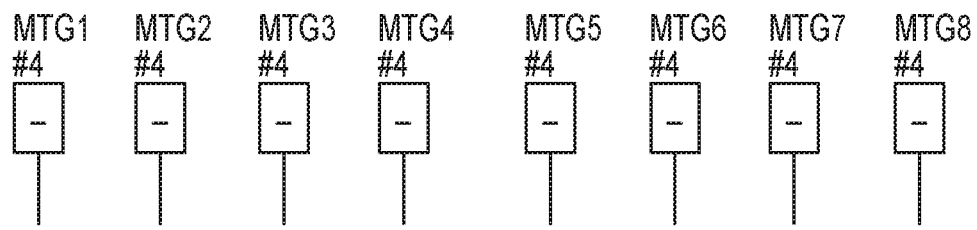
FIG. 10 is a close-up view of section "F" in FIG. 4.
Figure 11:
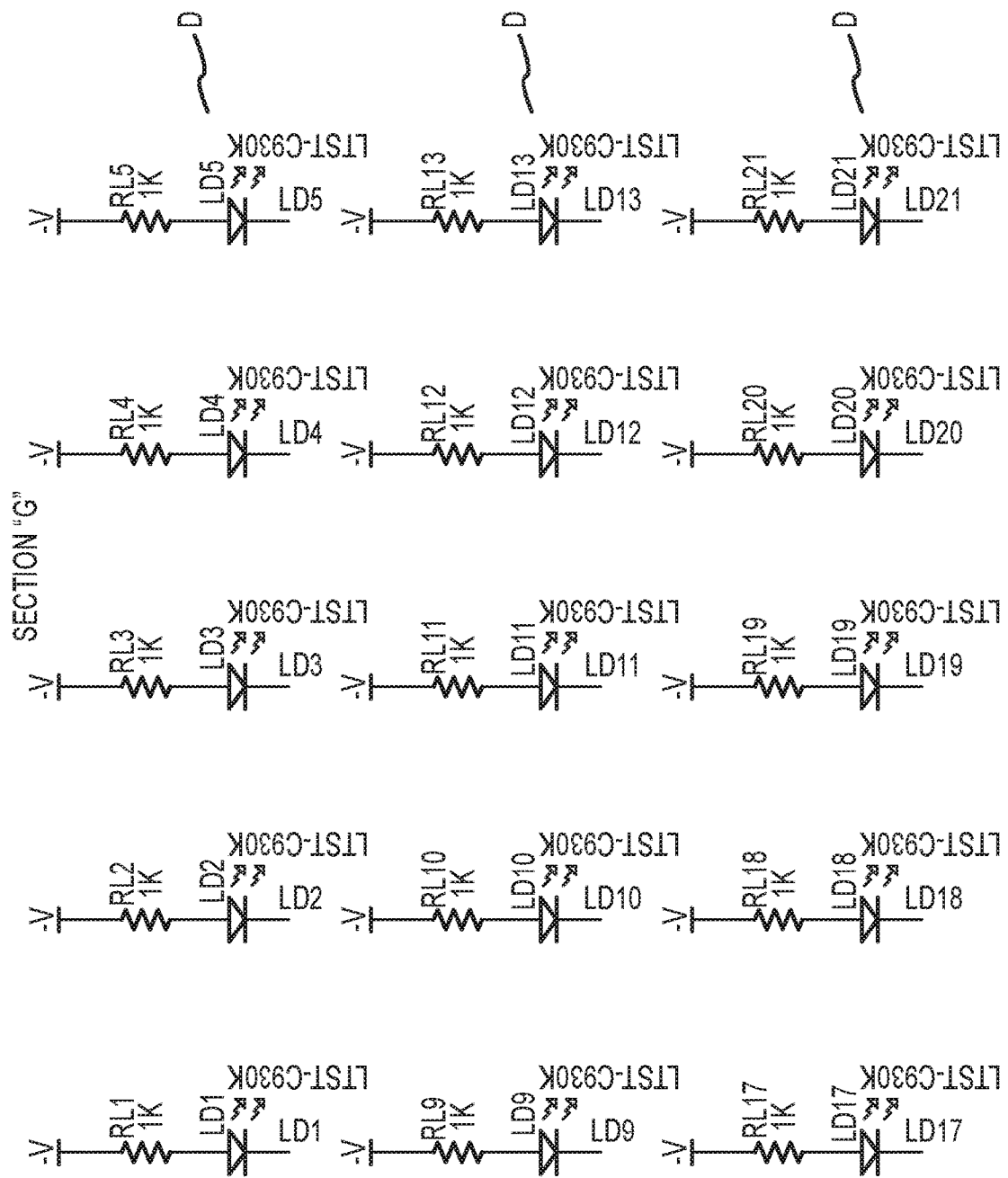
FIG. 11 is a close-up view of section "G" in FIG. 4, showing the circuit diagrams for a portion of the light-emitting diodes used in the laser training target.
Figure 12:
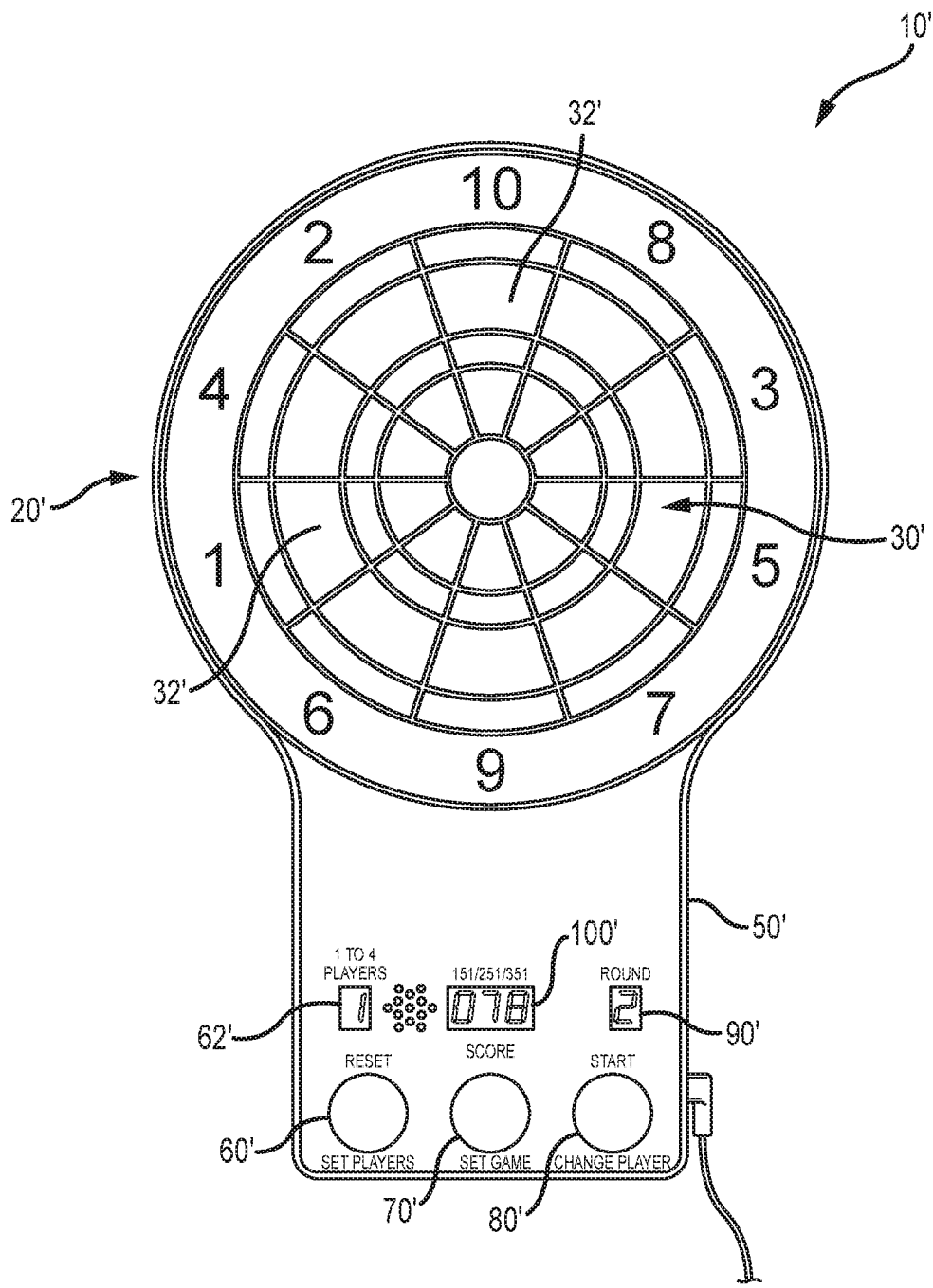
FIG. 12 is an alternate target in accordance with embodiments of the invention.
Figure 13:
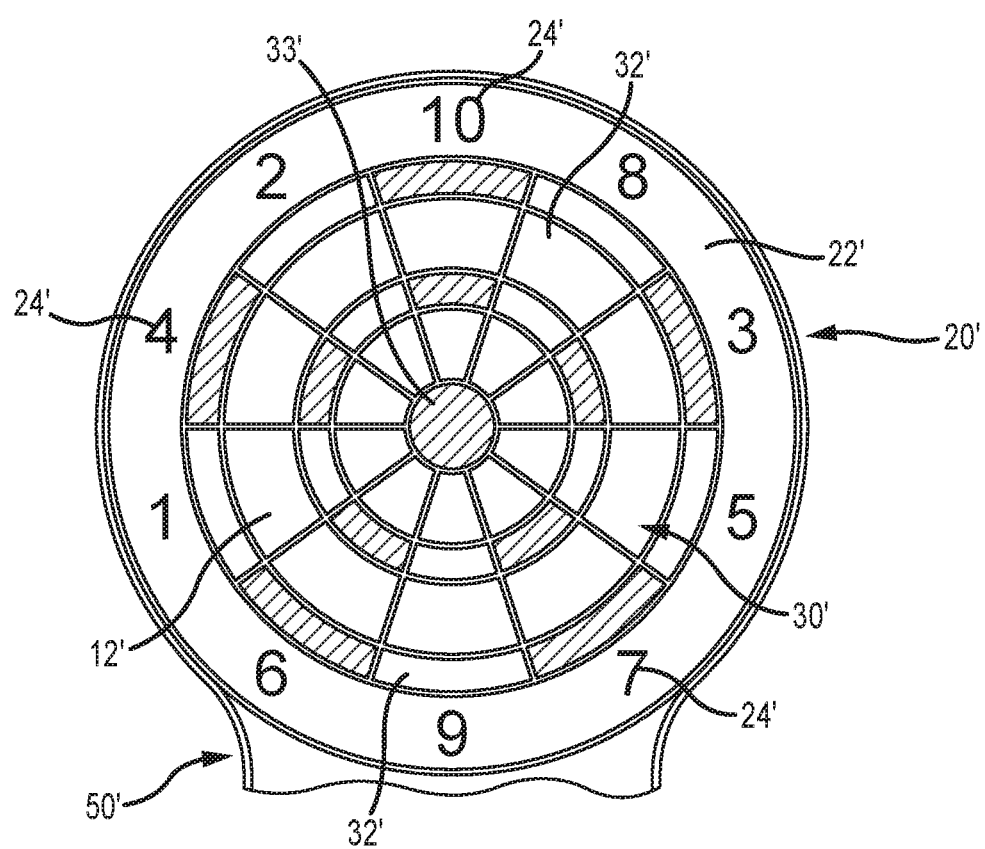
FIG. 13 is a close up of the target face of the target of FIG. 12.
Figure 14:
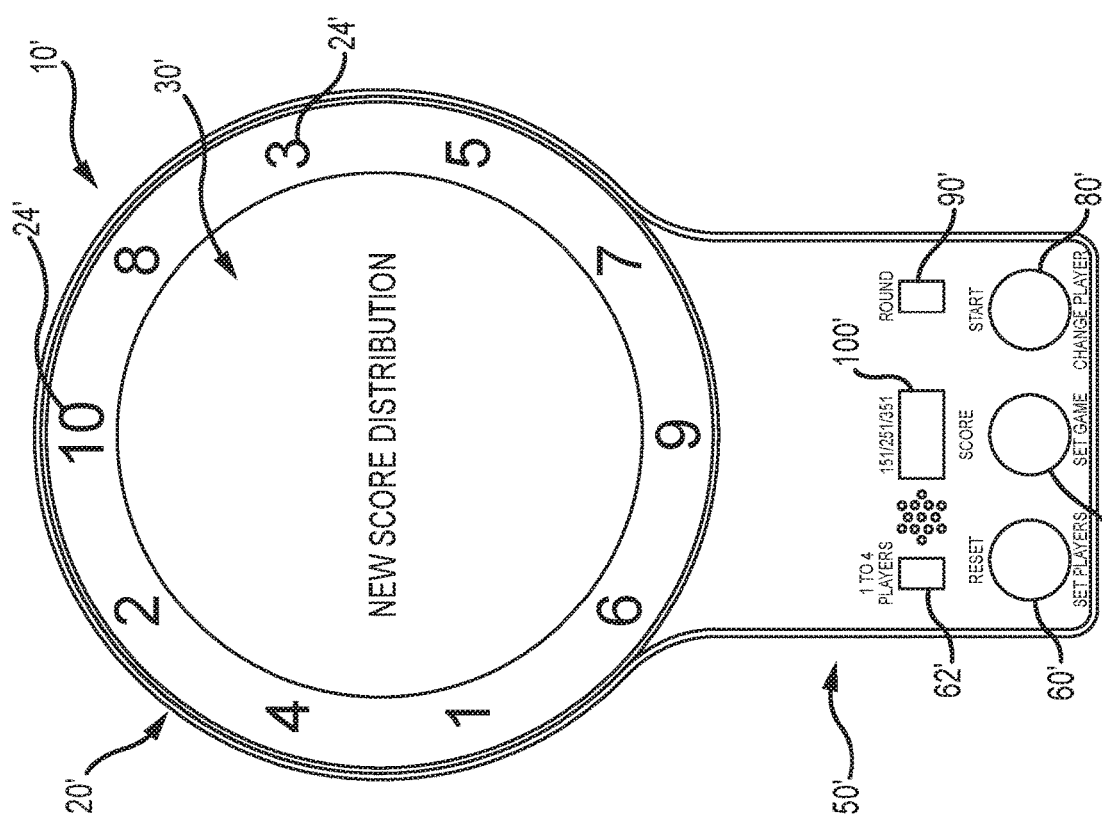
FIG. 14 is an image of the target of FIG. 12 not showing the target face, but depicting "current score."
Figure 15:
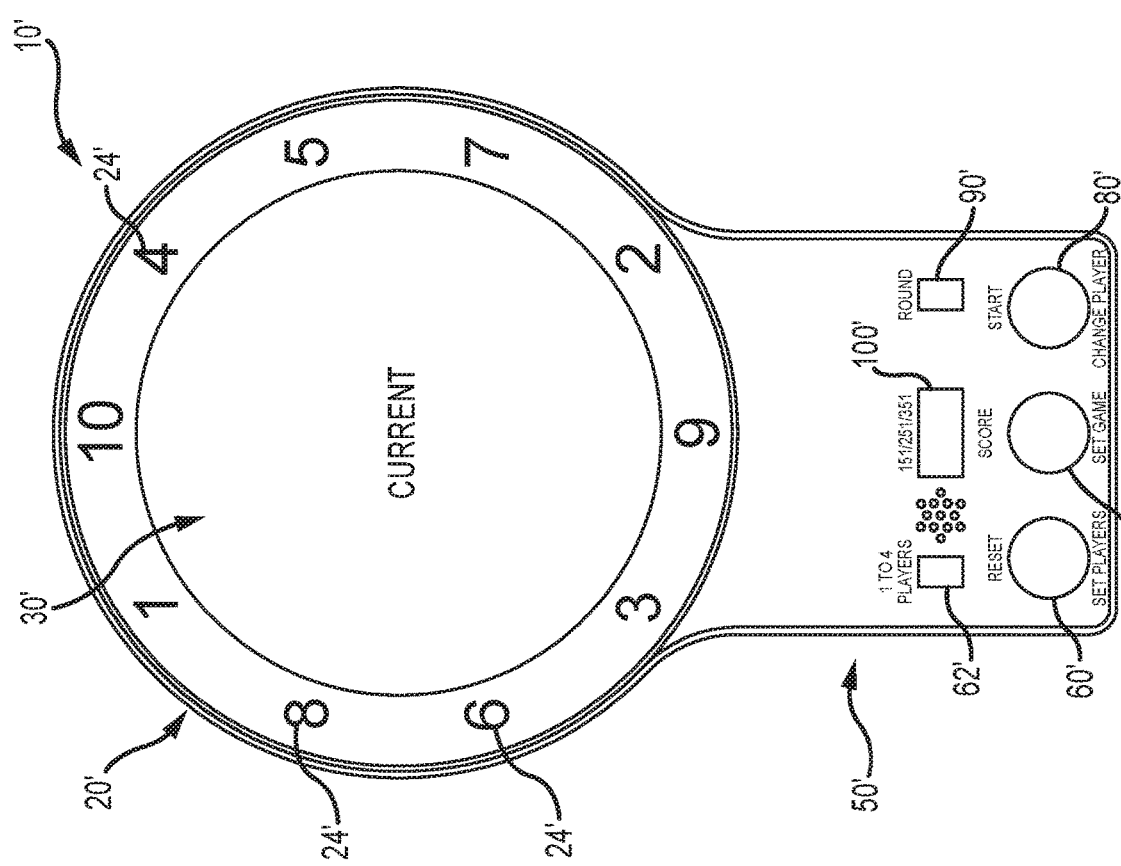
FIG. 15 is an image of the target of FIG. 14 depicting "new score distribution."

FIG. 4 depicts an exemplary circuit diagram of the laser trainer target shown in FIGS. 1-2. In this embodiment, the laser trainer target 10 includes 62 sensors S (the phototransistors shown in Section "A" of FIG. 5) and 62 optical displays D, which are preferably laser-activated LED lights (shown in Section "G" of FIG. 11). Detection of laser strikes and illumination of the optical displays D is controlled by three microcontrollers M (Sections "B," "C," and "D" in FIGS. 6-8, respectively). Section "E" of FIG. 9 illustrates the phototransistor sensors and switching used in the display and reset areas of the target 10.

Preferably, each sensor S and its corresponding optical display D are located in the same position (or very near to each other) behind the target screen 12 to show a laser hit as accurately as possible when the target 10 is in the display mode. A target of the present invention may be of any suitable size, shape and color. In the exemplary embodiment depicted in FIGS. 1 and 2, the screen 12 of the target 10, as well as the reset and display areas 18 and 20, are red in order to operate optimally with red laser light. A target of the present invention may include any desired number of sensor/optical display pairs, which may have any desired spacing. In the embodiment depicted here, there are 62 sensor/display combinations spaced about ½" apart. The target may also, for example, have sensor/display pairs spaced in a circular pattern spaced 1" apart expanding from the center of the target.

Preferably, only a single sensor/display pair is activated for each laser strike. In one embodiment, this can be accomplished by, for example: (a) only activating the display D corresponding to the sensor S that received the highest intensity laser light strike, and (b) delaying the activation of any other sensor/display pairs (which could be done by delaying the activation of one or more of the sensors and displays), by a predetermined amount of time, to avoid the target registering a single laser strike more than once. The predetermined delay is preferably long enough to not register a laser "dragged" across the target, but short enough to register hits from a person rapidly pulling the trigger on a firearm equipped with a laser-emitting device (such as a laser trainer cartridge). In one embodiment, there is a 25 ms delay between the permissible registration of laser strikes. During the delay the sensors S are deactivated from recording additional strikes.

In one embodiment, when a sensor S detects a laser strike, the strike is registered (either by the sensor or a microcontroller in communication with the sensor) until the reset function is activated. In some embodiments, multiple laser strikes upon the same sensor may be indicated by increasing the intensity of the light emitted from the optical display when the target 10 is in the display mode.

In one embodiment, the target may produce a sound (e.g., through a speaker) to indicate the target has been hit, as well as to indicate where on the target 10 the laser strike was registered. For example, one type of sound may be produced to indicate a "bulls-eye" while other sounds may be produced to indicate, respectively, a hit within each of the rings of the target.

The functionality of the laser training target 10 may be implemented using hardware, software, or combination of the two. In the exemplary target of FIG. 1, the microcontrollers M (FIGS. 6-8) execute instructions stored in a memory (either internal to the microcontroller M or external to the microcontroller M) to cause the processors to register laser strikes from the sensors S and illuminate the optical displays when the target 10 is in the display mode. As an alternative to the manual on/off switch 14 and display or reset areas 18 and 20 of the target 10, alternate embodiments of the target may be configured to interface to a remote control (e.g., a dedicated remote or application running on a device, such as a computer, in communication with the target) to perform various functions, including resetting the target, activating the display function of the target, turning the target on and off, adjusting an intensity level of one or more of the optical displays, and adjusting a volume level of one or more sounds produced by the target.

Target Game

Turning now to FIGS. 12-25, an alternate preferred embodiment of the invention is shown. A target game 10' according to aspects of the invention may be of any suitable size and shape. In accordance with one aspect, the target face 30' of target game 10' is the same size and shape as a conventional dart board, and in one preferred embodiment, target face 30' is preferably a white, translucent plastic. Target face 30' allows light to be projected onto its back surface 30B' to form a game image, such as a dart board, that can be seen from front surface 30A'. Target 30' permits laser light to pass through it, and is preferably printed on front surface 30A' with an outline of a game to be played.

Behind target face 30' is a score area 35'. Score area 35' is preferably comprised of black, or dark, injection-molded plastic having ridges 39', and includes scoring sections 37' having sub-scoring areas 37A', 37B', 37C', and 37D'. Score area 35' comprises raised ridges 39' between each scoring section 37', between each sub-scoring area 37A', 37B', 37C' and 37D', and between sub-scoring areas 37A' and bulls eye 33'. Ridges 39' preferably extend between ⅛" and 1⅛" from the back 30B' of target face 30', and are formed of opaque (such as black, as mentioned above) plastic, metal, or other material. Ridges 39' provide a physical separation of light projected by the PCB board 120', in order to prevent different colored lights from blending together when projected onto the back 30B' of target face 30'. Ridges 39' preferably touch the back surface 30B' target face 30', and are received in grooves 30C' (shown in FIG. 24), when target 10' is assembled. Score area 35' also includes tabs 35B' that accept fasteners (not shown), such as screws, that are received in the back 14' of housing 11'.

PCB 120' (shown in FIG. 22) projects light (preferably generated by LEDs) through the score area 35' and onto the back 30B' of target face 30'. Light sensors (not shown) are part of PCB 100' and function in the same manner as the previously-described sensors S for laser trainer target 10. PCB 120' also includes an optical display associated with each light sensor, and the optical displays function in the same manner as optical displays D for laser trainer target 10. The optical displays are preferably LEDs (light emitting diodes). Detection of a laser light strike and illumination of an optical display of target game 10' is controlled by one or more microcontrollers (not shown) in communication with PCB 120', and the manner in which strikes are recorded and illumination of one or more displays in response, is the same as for laser trainer target 10. Preferably, each sensor and corresponding optical display of target 10' are located in the same position, or very close, e.g., within $\frac{1}{32}$"-$\frac{1}{8}$", to each other.

Preferably, only a single sensor/display is activated for each laser strike. In one embodiment, this can be accomplished by: (a) only activating the display corresponding to the sensor that received the highest intensity laser light strike, and (b) delaying the activation of any other sensor/display pairs by a predetermined amount of time. The predetermined delay is preferably long enough to not register a laser "dragged" across the target. In one embodiment, there is a 0.025 second or longer, and preferably a 0.3 second to 3 second, or about a 2 second, delay between the permissible registration of laser strikes. During this delay relevant sensor(s), or all other sensors, are deactivated from recording additional strikes. As discussed below, all or parts of the target 10' may activate or flash during the delay time.

In this embodiment, different colored scoring sections 37' and sub-scoring areas are formed by the projection of light from PCB 100' through score area 35', and onto the back of target face 30'. The scoring sections 37' and sub-scoring areas of scoring area 35' can be seen through the front surface 30A' of target face 30', and printed lines on front surface 30A' define the boundaries between each section 37', and sub-scoring area, and bulls eye 33'.

In this embodiment, sub-scoring areas 37A', 37B', 37C' and 37D' have different colors projected through them and onto the back surface of target face 30', in order to make it easier for a player to detect the different scoring sections and sub-scoring areas when playing a game. The different colors may be yellow, green, blue, and red, or any suitable colors. Alternatively, target 10' may not use colors, or only some of the scoring sections and sub-scoring areas may be colored. If colors are used, the colors may be different than those in this embodiment.

Most preferably, a first group 110' of score areas 37' each has an outer sub-scoring area 37D' that is red, a sub-scoring area 37C' that is blue, a sub-scoring area 37D' that is red, and an innermost sub-scoring area 37A' that is blue. A second group 210' of score areas 37' each has an outer sub-scoring area 37D' that is blue, a sub-scoring area 37C' that is yellow, a sub-scoring area 37B' that is blue, and an innermost sub-scoring are 37A' that is yellow. In this embodiment, each of the first group 110' of scoring sections 37' alternate with each of the second group 210' of scoring sections 37'. A bulls eye 33' is preferably colored red, is in the center of score area 35' (and hence in the center of target face 30' when light is projected onto the back 30B' of target face 30' by PCB 100'), and is juxtaposed each of the sub-scoring areas 37A'.

Each sub-scoring area, and the bulls eye, has its own corresponding light sensor and optical display positioned on PCB 120'. In this embodiment, there are ten scoring sections 37', and each scoring section 37' has four sub-scoring areas 37A', 37B', 37C', and 37D'. Accordingly, there are forty sets of corresponding sensors and optical displays, plus a set for the bulls eye, for forty-one total sets. PCB 120' has segments 137' and 137A', 137B', 137C', and 137D', which correspond to scoring sections 37' and scoring sub-areas 37A', 37B', 37C', and 37D'. Segment 133' corresponds to bulls eye 33'. A light sensor and optical display are in each of the segments.

Target 10' may emit a sound (e.g., through a speaker) to indicate the target has been hit, as well as to indicate where on the target 10' the laser strike was registered. For example, one type of sound may be produced to indicate a "bulls eye" while other sounds may be produced to indicate, respectively, a hit within each of the relevant scoring sections and/or scoring sub-areas of the target 10'. Or, the same sound may be emitted for any strike. The sound may be a song or jingle if the game is completed, or a player registers a certain score, or a player wins the game.

The functionality of target game 10' may be implemented using hardware, software, or combination of the two. In the exemplary target game 10', PCBs 120' and 220' (FIGS. 22 and 23) execute instructions stored in a memory (either internal or external to the PCBs 120' and 220') to cause one or more microprocessors (not shown) to register laser strikes from the sensors, illuminate the optical displays, cause sounds to be emitted, and calculate and store a score. There may, however, be only one PCB or more than two PCBs.

Figure 18:
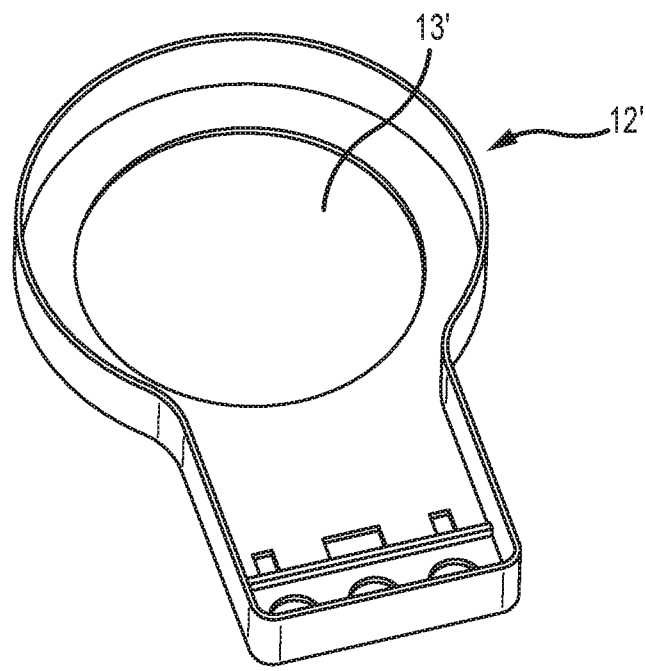
FIG. 18 is a back, perspective view of a front housing portion of the target of FIG. 12.
Figure 19:
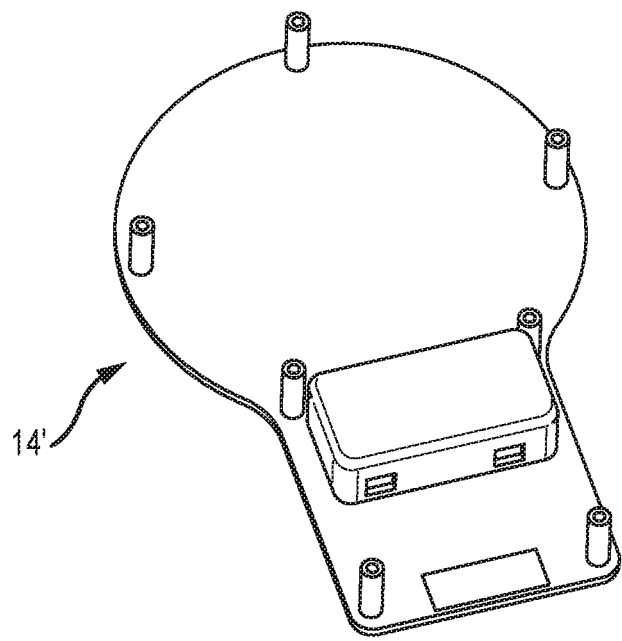
FIG. 19 is a front, perspective view of a back portion of the housing of FIG. 12.
Figure 20:
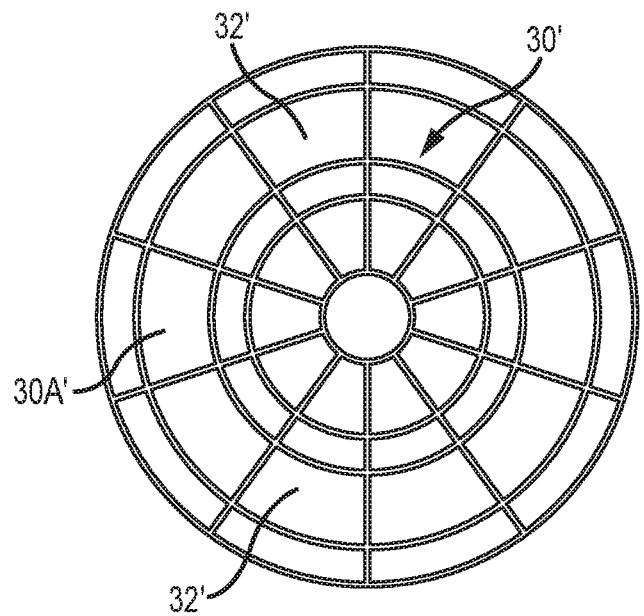
FIG. 20 is a target of the target of FIG. 12.
Figure 21:
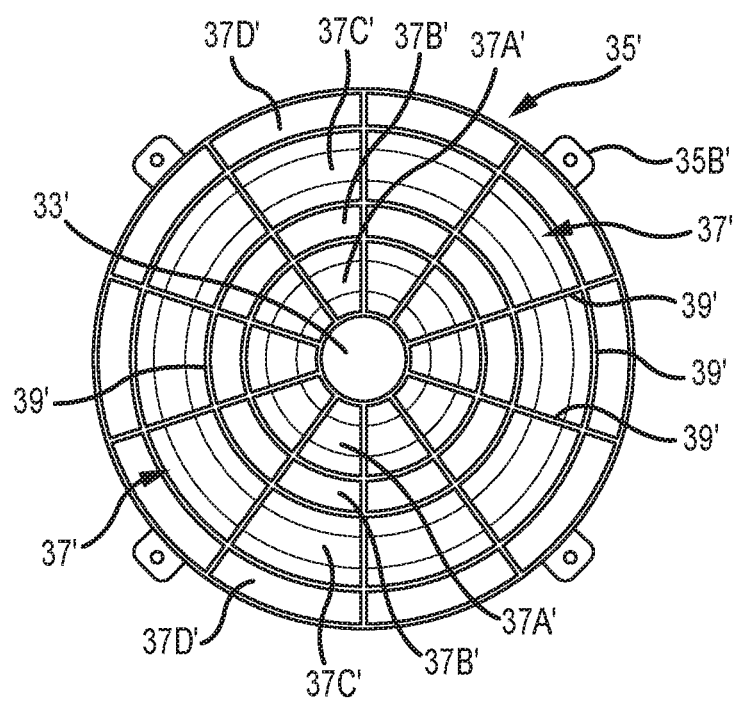
FIG. 21 is a target face of the target of FIG. 12 showing the score areas.
Figure 22:
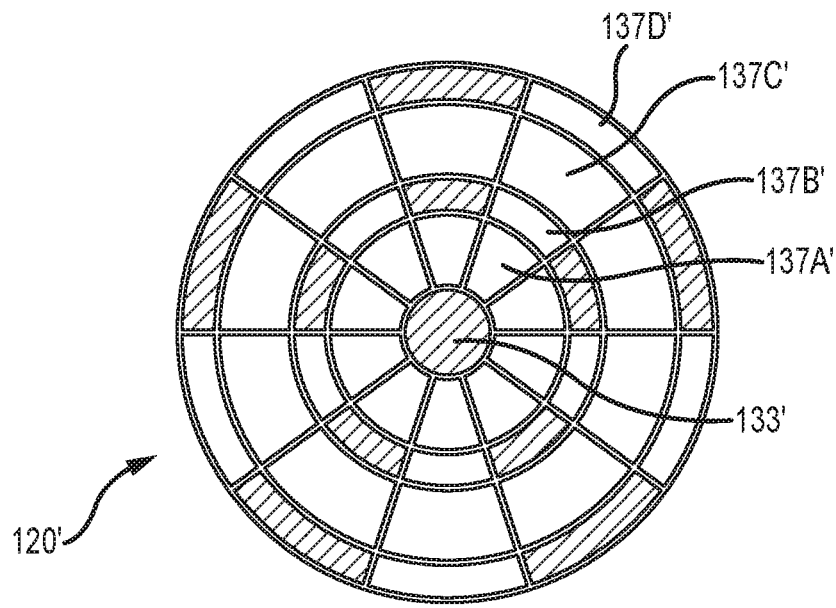
FIG. 22 shows a printed circuit board that may be used with the target of FIG. 12.
Figure 23:
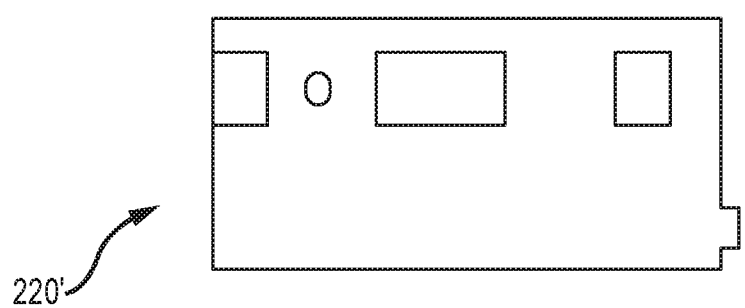
FIG. 23 shows a second printed circuit board that may be used with the target of FIG. 12.
Figure 24:
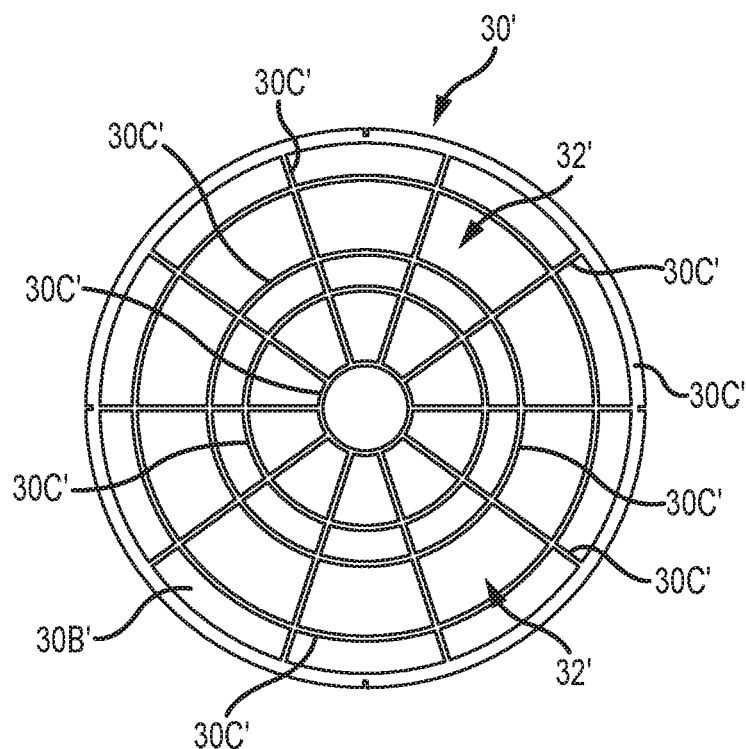
FIG. 24 shows a back surface of a target face in accordance with aspects of the invention.
Figure 25:
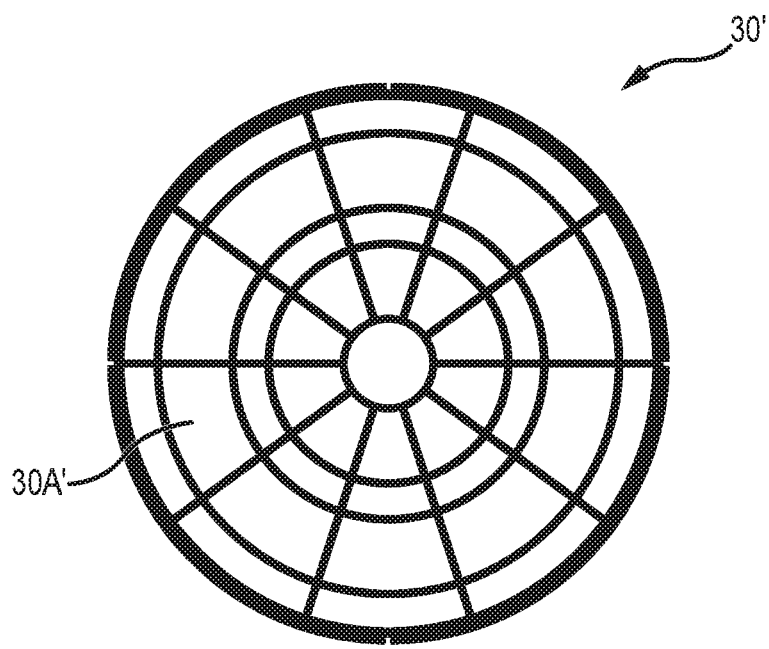
FIG. 25 shows a front surface of a target face in accordance with aspects of the invention.

As shown in FIGS. 18-19, the target preferably includes a plastic housing 11' comprised of a front piece 12' and a back piece 14' that are snapped together or held together with fasteners, such as screws. The target face 30', score area 35', and electronics of target 10', including PCB 100' shown in FIG. 22 and PCB 200' shown in FIG. 23, are held in place and positioned inside of housing 11'. The front piece 12' of housing 11' has an opening 13' to expose front surface 30A' of target face 30'.

Figures 16, 17:
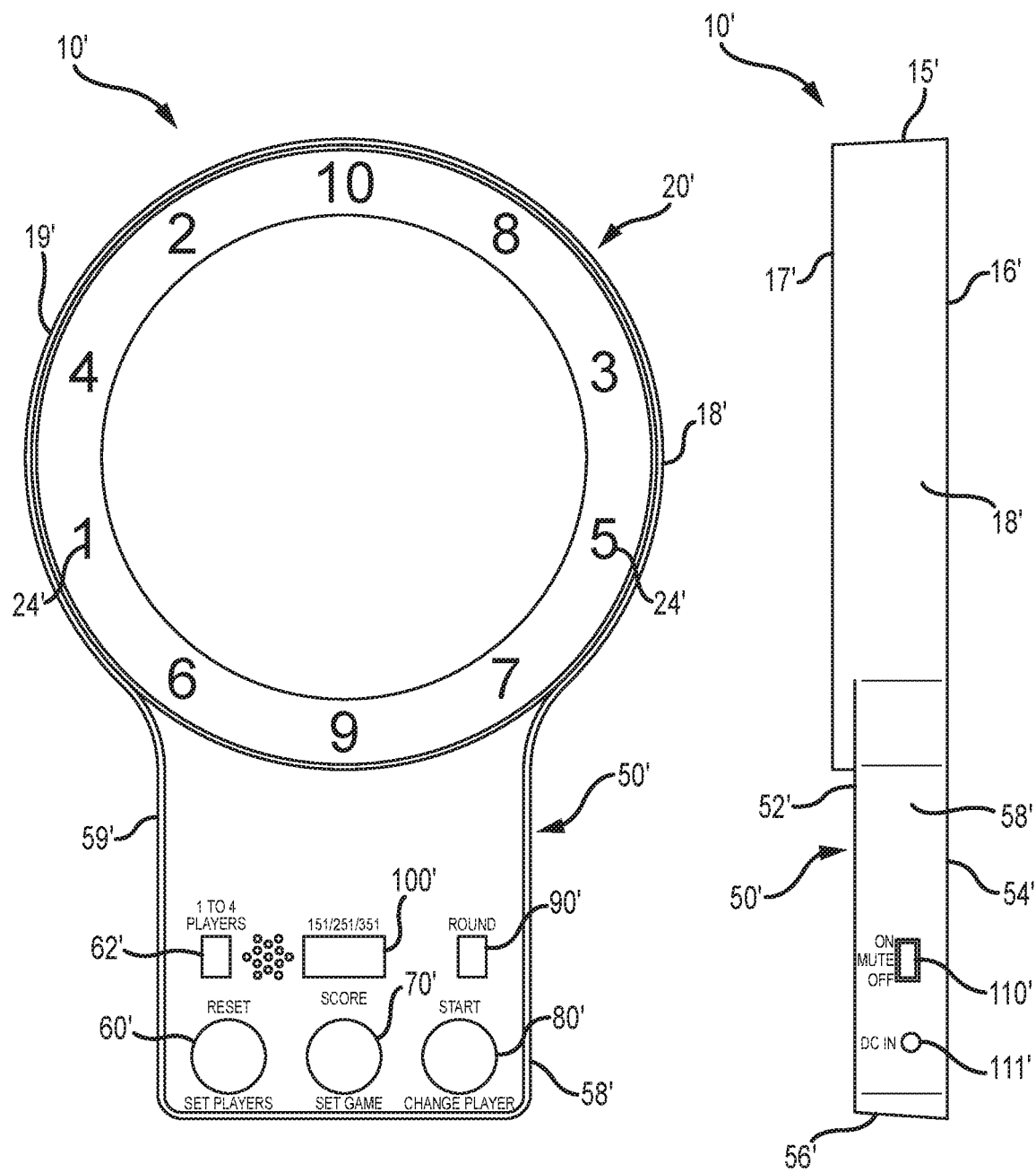
FIG. 16 is a front view of the target of FIG. 12 that does not show the target face.
FIG. 17 is a side view of the target of FIG. 16.

As shown in FIG. 17, the top section of target 10' has a top edge 15', a front 17' (that includes target face 30'), a back 16', and two sides 18' and 19'. In this example, target 50' has a manual off/on switch 110' and a power plug receiver 111'.

When assembled, PCB 100' is juxtaposed the front side 16A' of back 16' of housing 11'. Score area 35' is juxtaposed PCB 120' and target face 30' is positioned on the side of score area 35' opposite PCB 120'. Light projected by PCB 120' passes through score area 35' and onto the back surface of target face 30'.

Outside of the target face 30' on the assembled target game 10' is an outer area 20' that, in this embodiment, corresponds to the non-scoring outer area on a dart board. This outer area 20' includes numbers 24' or other indicia that correspond to the scoring areas 32' on the target face (which in the embodiment shown, correspond to the numbers and pie-shaped scoring areas on a dart board).

As shown in FIGS. 12 and 14-17, target 10' has a control section 50'. Control section 50' includes a front 52', a back 54', a bottom edge 56', two sides 58' and 59', and a PCB 220' positioned inside of target 10'. In this embodiment, PCB 220' controls the functioning of areas 60', 70', and 80'. PCB 220' includes optical sensors (not shown) that detect laser light strikes, and may include optical displays (not shown) to illuminate areas 60', 70' and 80', and optically illuminate indicia regarding one or more areas 60', 70', and 80'. Positioned on the front 52' of control section 50' is a set players/reset area 60', a set game area 70', and a start/change player area 80'. Each of these is preferably made of transparent, or white translucent plastic, so laser light can pass through to strike printed circuit board 220' with light detectors that are positioned inside of target 10'. When the printed circuit board 220' senses a strike of laser light, it causes a change of the function of target 10' in the manner described or claimed herein.

Control section 50' also has a player display 62', which electronically displays the number of players playing a selected game, and a "round" display 90' that displays which round of the game the players are on. A score display 100' displays the score for the player currently shooting at target 10' (i.e., the player whose turn it is).

In a preferred embodiment, when target 10' is first turned on, all of the scoring sections 37' are illuminated and are visible on front surface 30A'.

In a preferred method of operation, when target 10' is on, whatever score section 37' and sub-area is struck by laser light causes target 10' to beep, and the struck segment 37' (or just the sub-area of section 37' that was struck) flashes on and off, and the score for the strike is recorded. In this embodiment, target 10' does not record a laser light strike until after scoring section 37' stops flashing, which is preferably between 0.5 and 3 seconds. If a laser light strike is directly on a line between two scoring sections 37', or between two of the sub-areas 37A', 37B', 37C', and 37D', the PCB determines which sensor received more light from the laser light strike, and the strike is recorded there.

In one manner of playing a game according to aspects of the invention, the target 10' is first turned on. This can be done in any suitable manner, such as by pressing switch 110' on target 10', or using a remote wired or wireless control. Then, the number of players, and type of game, can be selected by striking areas 60' and 70', respectively, with laser light. The game is then started by striking area 80' with laser light.

In this example, the number of players automatically defaults to "1," and by striking the "set players" area 60' with laser light, between one and four players can be selected, although the target may be programmed to select any suitable number of players depending upon the type of game. The number of players selected appears in display 62'. Here, the default is the number "1" as for each laser strike on area 60, the number increases by one until it reaches "4." Then it cycles back to "1."

In this example, after the number of players has been selected and the game starts, the set players area 60' changes function and becomes a "reset" area to reset the target after a game is complete, or before completion of the game if the player(s) do not wish to continue. Electronic indicia above, below, or next to area 60' can be used to display/illuminate "Set Players" or "Reset," depending upon the current functioning of area 60'. Alternatively, there may separate areas that control each function of "set players" and "reset."

The "set game" area 70' defaults to a particular game, and the game can be changed by striking the set game area 70' with laser light. In the example shown, the game type defaults to a dart game known as "301," and by striking set game area 70' with laser light, target 10' can be changed to play dart games 151, 251, or 351. So, one of four dart games may be selected in the example shown. Here, the game selected is illuminated above display 100'. When the game is changed, the function of the target 50 changes to correspond to the game. As an example, the manner in which the target face illuminates may change (and may change per round), and the scoring may change, depending upon the game selected. Here, the function of target 10' changes based on which of four dart games is selected. Any number or types of suitable games, however, may be programmed into a target according to the invention.

After the number of players and game is selected, which may be done in any order, the "Start" area 80' is struck with laser light to start the game. In the embodiment shown, the start area 80' changes function and becomes the "Change Player" area once the game is started. Electronic indicia above, below, or next to area 80' can be used to display/illuminate "Start" or "Change Player," depending upon the current functioning of area 80'. Alternating, there may be separate areas that control each function of "start" and "change player."

A sound, such as a beep, may be emitted by the target when either one or more of the set player/reset area 60', set game area 70', or start/change player area 80', is struck with laser light.

Once the game begins, the player(s) take turns and shoot laser light at the relevant scoring areas 32' on the target face 30'. If laser light strikes the target face 30', the target face 30' preferably registers the strike, and preferably illuminates at the point of the strike and/or emits a sound. The target 10' may, however, be programmed to register a laser light strike only if the strike is within the appropriate scoring area 32' of target face 30' for the round of the game selected. In one embodiment, after being struck with laser light, the location on the target face 30' where the laser light strikes blinks for 0.5 seconds and a buzzer noise is emitted during that time. Alternatively, no sound need be emitted and the strike location may illuminate in any manner for any suitable time. For example, the target may illuminate as a flashing or steady illumination for 0.2-3 seconds, and may be of a color different than the color of the target area struck by laser light. A sound may or may not be emitted during this time.

If a player strikes the correct scoring area 32' during a round, the target 10' registers and stores the score. It adds, or subtracts, the score per player as the game progresses. If a player strikes a portion of the target face 30' outside of the relevant scoring area 32', a different noise and/or light may illuminate at the point of the strike in order to show the player where the laser light struck, so the player can adjust his/her aim. Or, target 10' may have no response to a missed shot even if the shot strikes target face 30'.

If a player misses the target face 30' completely, no strike will be registered. Player(s) must, if they desire, keep mental track of such misses. If each player gets three shots per round, and misses the target face entirely on one shot, the "change player" area must eventually be struck by laser light to set the target for the next player. If a player has three shots per round and strikes the target face 30' with all three shots, target 10' automatically sets for the next player. Depending upon the type of game, each player receives a pre-programmed number of shots per round.

For dart game 301, if at any time a player's total score goes below zero (i.e., becomes a negative number) the score does not update to the negative score. Instead: (a) the player's total score is updated to the temporary total score (i.e., this player's score at the beginning of that round), and shown on the score display at the same time. If a player's score goes below zero when game 301 is selected, he/she loses any remaining shots in that round and target 10' sets for the next player. As people knowledgeable about dart games are aware, to win the 301 game, a player must end his/her score at zero.

When a player wins the selected game (a) one or more lights, (b) different colored lights, (c) light in patterns, (d) light in patterns of differing colors, and/or (e) sound, may be emitted by target 50.

Having thus described some embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A target game for sensing a laser light striking a target, comprising (a) a target face that allows the laser light to pass through the target face to form a game image; (b) a score area and plurality of sensors behind the target face, wherein the score area comprises a plurality of ridges and scoring areas and wherein each of the plurality of sensors is for sensing when the target face has been exposed to the laser light; (c) a plurality of optical displays, wherein each optical display of the plurality of optical displays is paired with one of the plurality of sensors thereby forming a desired number of sensor/optical display pairs which are positioned so that only a single sensor/display pair is activated by each laser light strike; and (d) a game selection area that allows game selection to be varied, wherein the game selection area has a default first game type, which when struck by the laser light, changes from the first game type to a second game type, which changes target function depending upon the second game type selected.

2. The target game of claim 1 that is battery powered.

3. The target game of claim 1 that has a manual off-on switch.

4. The target game of claim 1 wherein each of the optical displays is a light emitting diode.

5. The target game of claim 1 further comprising a reset mode wherein the target is reset to another game when the reset is activated.

6. The target game of claim 5 wherein the reset mode is activated by striking a reset area on the target by the laser light.

7. The target game of claim 1 that has a plurality of scoring sections.

8. The target game of claim 1 wherein each sensor is in electrical communication with an optical display located at the same relative position on the target as the sensor.

9. The target game of claim 1 wherein only one sensor is activated for each laser light strike.

10. The target game of claim 1 wherein the laser light strike is recorded by the sensor that senses the highest light intensity from the strike.

11. The target game of claim 1 wherein the laser light strike on the target face activates a sensor that senses the laser light strike and the other sensors are deactivated for a predetermined period.

12. The target game of claim 11 wherein the target flashes before the sensors reactivate.

13. The target game of claim 1 wherein the target face is configured to emit a sound when the laser strike is detected.

14. The target game of claim 1 further comprising a remote control configured to control the target game, wherein controlling the target game includes one or more of:
   activating the display function of the target;
   turning the target on;
   turning the target off;
   adjusting an intensity level of one or more of the optical displays; and
   adjusting a volume level of one or more sounds produced by the target.

15. The target game of claim 1 that further includes a start game area that, when struck by the laser light, starts the game selected.

16. The target game of claim 15 wherein the start game area is spaced apart from the target face by 1"-12".

17. The target game of claim 15 wherein the start game area changes to a change player area after the game is started.

18. The target game of claim 1 wherein the game selection area changes to a reset area after the game has been started.

19. The target game of claim 1 that projects one or more of the following when a player wins the selected game (a) one or more lights, (b) different colored lights, (c) light in patterns, (d) light in patterns of differing colors, and (e) sound.

20. The target game of claim 2 that is powered by a single, 9V battery.

21. The target game of claim 3 wherein the target has a housing and the off/on switch is positioned on the housing.

22. The target game of claim 11 wherein the other sensors are deactivated for 25 ms.

23. The target game of claim 1 wherein the target function includes changing target face illumination and/or game scoring.

24. The target game of claim 1 wherein the default first game type is a dart game.

25. The target game of claim 1 wherein the second game type is a dart game.

26. The target game of claim 1 wherein the default first game type is a first type of dart game and the second game type is a second type of dart game.

* * * * *